(12) United States Patent
Takahashi et al.

(10) Patent No.: US 11,502,335 B2
(45) Date of Patent: Nov. 15, 2022

(54) ELECTROLYTE FOR NON-AQUEOUS ELECTROLYTE BATTERY AND NON-AQUEOUS ELECTROLYTE BATTERY USING THE SAME

(71) Applicant: CENTRAL GLASS CO., LTD., Yamaguchi (JP)

(72) Inventors: Mikihiro Takahashi, Ube (JP); Takayoshi Morinaka, Ube (JP); Wataru Kawabata, Ube (JP); Makoto Kubo, Kasai (JP); Katsumasa Mori, Kasai (JP)

(73) Assignee: CENTRAL GLASS CO., LTD., Yamaguchi (JP)

( * ) Notice: Subject to any disclaimer, the term of this patent is extended or adjusted under 35 U.S.C. 154(b) by 276 days.

(21) Appl. No.: 16/769,499

(22) PCT Filed: Dec. 5, 2018

(86) PCT No.: PCT/JP2018/044756
§ 371 (c)(1),
(2) Date: Jun. 3, 2020

(87) PCT Pub. No.: WO2019/111958
PCT Pub. Date: Jun. 13, 2019

(65) Prior Publication Data
US 2020/0388878 A1 Dec. 10, 2020

(30) Foreign Application Priority Data

Dec. 6, 2017 (JP) .............................. JP2017-234475
Nov. 28, 2018 (JP) .............................. JP2018-222681

(51) Int. Cl.
*H01M 10/0567* (2010.01)
*H01M 4/505* (2010.01)
*H01M 4/525* (2010.01)
*H01M 10/0525* (2010.01)
*H01M 10/0568* (2010.01)
*H01M 10/0569* (2010.01)
*H01M 10/058* (2010.01)
*H01M 4/02* (2006.01)

(52) U.S. Cl.
CPC ....... *H01M 10/0567* (2013.01); *H01M 4/505* (2013.01); *H01M 4/525* (2013.01); *H01M 10/058* (2013.01); *H01M 10/0525* (2013.01); *H01M 10/0568* (2013.01); *H01M 10/0569* (2013.01); *H01M 2004/028* (2013.01); *H01M 2300/004* (2013.01); *H01M 2300/0034* (2013.01)

(58) Field of Classification Search
CPC ........... H01M 10/0567–0569; H01M 10/0525; H01M 10/058; H01M 4/525; H01M 4/505
See application file for complete search history.

(56) References Cited

U.S. PATENT DOCUMENTS

| | | |
|---|---|---|
| 5,626,981 A | 5/1997 | Simon et al. |
| 6,045,945 A | 4/2000 | Hamamoto et al. |
| 2002/0081496 A1 | 6/2002 | Tsujioka et al. |
| 2014/0023934 A1 | 1/2014 | Otsuki et al. |
| 2014/0193706 A1 | 7/2014 | Morinaka et al. |
| 2018/0254516 A1 | 9/2018 | Han et al. |
| 2018/0301758 A1 | 10/2018 | Abe et al. |

FOREIGN PATENT DOCUMENTS

| | | |
|---|---|---|
| CN | 105859760 | 8/2016 |
| CN | 108226374 | 6/2018 |
| JP | 8-45545 | 2/1996 |
| JP | 10-270076 | 10/1998 |
| JP | 2002-110235 | 4/2002 |
| JP | 2002-184461 | 6/2002 |

(Continued)

OTHER PUBLICATIONS

International Search Report dated Feb. 26, 2019 in International (PCT) Application No. PCT/JP2018/044756.

(Continued)

*Primary Examiner* — Karie O'Neill Apicella
(74) *Attorney, Agent, or Firm* — Wenderoth, Lind & Ponack, L.L.P.

(57) ABSTRACT

Provided are an electrolyte for a non-aqueous electrolyte battery using a positive electrode including nickel, where the battery generates a small amount of gas during a durability test even if the cell potential reaches 4.1 V or more, as well as a non-aqueous electrolyte battery using the electrolyte. In the electrolyte for a non-aqueous electrolyte battery including a positive electrode including at least one selected from the group consisting of oxides containing nickel and phosphates containing nickel as a positive electrode active material, the electrolyte comprises (I) a non-aqueous organic solvent, (II) a fluorine-containing solute being an ionic salt, (III) at least one additive selected from the group consisting of compounds represented by formulae (1) and (2), and (IV) hydrogen fluoride in an amount of 5 mass ppm or more and less than 200 mass ppm based on the total amount of the components (I), (II), and (III).

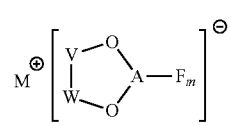

(1)

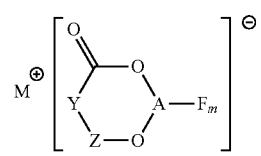

(2)

20 Claims, No Drawings

(56) References Cited

FOREIGN PATENT DOCUMENTS

| | | | | |
|---|---|---|---|---|
| JP | 2002-329528 | 11/2002 | | |
| JP | 2004-95188 | 3/2004 | | |
| JP | 2005-5115 | 1/2005 | | |
| JP | 2005-317446 | 11/2005 | | |
| JP | 2007-250288 | 9/2007 | | |
| JP | 2007-335143 | 12/2007 | | |
| JP | 2010-238504 | 10/2010 | | |
| JP | 2012-186011 | 9/2012 | | |
| JP | 2013-30465 | 2/2013 | | |
| JP | 2013-51122 | 3/2013 | | |
| JP | 2013-69512 | 4/2013 | | |
| JP | 2013069512 A * | 4/2013 | .......... | H01M 10/052 |
| JP | 2016-26991 | 2/2016 | | |
| JP | 2016-69328 | 5/2016 | | |
| JP | 2017-061464 | 4/2017 | | |
| KR | 10-2017-0034333 | 3/2017 | | |
| WO | 2016/002771 | 1/2016 | | |
| WO | 2017/055282 | 4/2017 | | |

OTHER PUBLICATIONS

Extended European Search Report dated Jul. 29, 2021 in European Patent Application No. 18885931.8.

Notification of Reason for Refusal dated Mar. 15, 2022 in corresponding Korean Patent Application No. 10-2020-7019331, with Machine Translation.

\* cited by examiner

ELECTROLYTE FOR NON-AQUEOUS ELECTROLYTE BATTERY AND NON-AQUEOUS ELECTROLYTE BATTERY USING THE SAME

TECHNICAL FIELD

The present invention relates to a non-aqueous electrolyte for a non-aqueous electrolyte battery as well as a non-aqueous electrolyte battery using the non-aqueous electrolyte.

BACKGROUND ART

In batteries that are electrochemical devices, in recent years, storage systems to be applied to small equipment that needs high energy density, such as information equipment and communication equipment, specifically, personal computers, video cameras, digital still cameras, cell phones, and smartphones, and storage systems to be applied to large equipment that needs high power, such as auxiliary power and energy storage for electric vehicles, hybrid electric vehicles, and fuel cell electric vehicles, have attracted attention. A non-aqueous electrolyte battery such as a lithium ion battery, which has a high energy density, a high voltage, and a high capacity, has been actively developed as a candidate thereof, and is currently being researched and developed.

As the electrolyte for a non-aqueous electrolyte battery (hereinafter may be referred to as "non-aqueous electrolyte"), a non-aqueous electrolyte prepared by dissolving a fluorine-containing electrolyte as a solute, such as lithium hexafluorophosphate (hereinafter, $LiPF_6$), lithium bis(fluorosulfonylimide) (hereinafter, LiFSI), or lithium tetrafluoroborate (hereinafter, $LiBF_4$), in a non-aqueous solvent, such as a cyclic carbonate, a chain carbonate, or an ester is often used because they are suitable for obtaining a high-voltage and high-capacity battery. However, such a non-aqueous electrolyte battery using a non-aqueous electrolyte does not always have satisfactory battery characteristics such as cycle characteristics and output characteristics.

For example, in a case of a lithium ion secondary battery, when lithium cations are inserted into the negative electrode during the initial charge, the negative electrode reacts with lithium cations or the non-aqueous solvent to form a film mainly composed of lithium oxide, lithium carbonate, or lithium alkyl carbonate on the surface of the negative electrode. The film on the electrode surface is called a solid electrolyte interface (SEI), and the properties thereof greatly affect the battery performance, for example, reductive decomposition of the non-aqueous solvent is further prevented to suppress the deterioration of the battery performance. In addition, as the positive electrode, generally, a composite oxide of a transition metal and lithium, such as $LiCoO_2$, $LiNiO_2$, $LiNi_{0.8}Co_{0.2}O_2$, $LiMn_2O_4$, or $LiMnO_2$ is used. However, similarly, a film of the decomposition product is also formed on the surface of the positive electrode. It is known that this film also plays an important role, such as prevention of oxidative decomposition of the solvent to suppress gas generation in the battery.

In order to improve the battery characteristics such as cycle characteristics and low-temperature characteristics, it is important to form a stable SEI having high ion conductivity and low electron conductivity, and attempts to form good SEIs by adding a small amount (usually 0.001 mass % or more and 10 mass % or less) of a compound called an additive to an electrolyte have been actively and widely performed.

For example, as an additive for forming an effective SEI, Patent Literature 1 uses vinylene carbonate (hereinafter referred to as VC); Patent Literature 2 uses an unsaturated cyclic sulfonic acid ester such as 1,3-propene sultone; Patent Literature 3 uses lithium bisoxalatoborate (hereinafter referred to as LIBOB); Patent Literature 4 uses LIBOB and anhydrous trifluoroacetic acid or lithium trifluoroacetate; Patent Literature 5 uses lithium difluorooxalatoborate (hereinafter referred to as LDFOB) or lithium tetrafluorooxalatophosphate (hereinafter referred to as LTFOP) and VC; and Patent Literature 6 uses LDFOB or LTFOP and a carboxylic acid ester.

The LDFOB and the LTFOP are reductively decomposed on the negative electrode as described above and form an SEI on the surface thereof to prevent decomposition of the non-aqueous solvent. As a result, the characteristics as a battery, such as the cycle characteristics and the output characteristics, are improved. In this case, when the content of LDFOB or LTFOP in a non-aqueous electrolyte is a certain amount or more, the LDFOB or the LTFOP is not completely reductively decomposed on the negative electrode during the initial charge and remains in the non-aqueous electrolyte.

When the positive electrode is lithium cobaltate or lithium manganate, the risk of oxidative decomposition of the remaining LDFOB or LTFOP on the positive electrode is high but does not lead to large gas generation and does not matter. However, a major problem has become clear in that if the cell potential reaches 4.1 V or more in a battery whose positive electrode is a metal oxide containing nickel, residual LDFOB or LTFOP is gradually oxidatively decomposed on the positive electrode to significantly increase the amount of gas components having low solubility in the electrolyte, such as carbon monoxide, methane, and ethane, during a durability test such as a cycle test and a high-temperature storage test.

In addition, the present applicant reported in Patent Literatures 7 and 8 borate compounds in which two fluorine atoms of $LiBF_4$ are substituted with one malonic acid molecule ((2a) described below), 2-hydroxy-3-trifluoro-3'-trifluoroisobutyric acid ((1d) described below), or 3-hydroxy-4-trifluoro-4'-trifluoroisovaleric acid ((2g) described below), which are similar to LDFOB ((1a) described below) in which two fluorine atoms of $LiBF_4$ are substituted with one oxalic acid molecule; and phosphate compounds in which two fluorine atoms of $LiPF_6$ are substituted with one malonic acid molecule ((2i) described below), 2-hydroxy-3-trifluoro-3'-trifluoroisobutyric acid ((1l) described below), or 3-hydroxy-4-trifluoro-4'-trifluoroisovaleric acid ((2o) described below), which are similar to LTFOP ((1i) described below) in which two fluorine atoms of $LiPF_6$; are substituted with one oxalic acid molecule. When these compounds are likewise used in a lithium ion battery whose positive electrode is a metal oxide containing nickel, and whose cell potential reaches 4.1 V or more, a problem of the gas amount significantly increasing during a durability test is caused. Here, a compound in which two fluorine atoms of $LiBF_4$ or $LiPF_F$ are substituted with a bidentate ligand, such as oxalic acid, is referred to as a monochelate complex.

In order to minimize the residual monochelate complex, it is necessary to decompose the monochelate complex as much as possible by sufficiently performing aging during the initial charge. For example, Patent Literature 9 discloses that the resistance during charging/discharging of a battery constituted of an electrolyte including LDFOB is decreased by performing aging at 60° C. at a voltage of 4.1 V within 168 hours, compared to a battery not subjected to aging.

Incidentally, nickel-containing composite oxides represented by $LiNi_{0.8}Co_{0.2}O_2$ and olivine type phosphates represented by $LiMPO_4$ (M: Fe, Mn, Ni, or Co) have attracted attention as positive electrode active materials replacing $LiCoO_2$ which is currently a main positive electrode active material for a lithium ion battery, and Patent Literature 10 discloses an additive for improving the charge storage characteristics and discharge storage characteristics under the high-temperature environment of lithium ion batteries using these positive electrode active materials.

PRIOR ART REFERENCES

Patent Literature

[Patent Literature 1] Japanese Unexamined Patent Application Publication No. Hei 08-045545
[Patent Literature 2] Japanese Unexamined Patent Application Publication No. 2002-329528
[Patent Literature 3] Japanese Unexamined Patent Application Publication No. 2007-335143
[Patent Literature 4] Japanese Unexamined Patent Application Publication No. 2010-238504
[Patent Literature 5] Japanese Unexamined Patent Application Publication No. 2005-005115
[Patent Literature 6] Japanese Unexamined Patent Application Publication No. 2005-317446
[Patent Literature 7] Japanese Unexamined Patent Application Publication No. 2002-184461
[Patent Literature 8] Japanese Unexamined Patent Application Publication No. 2002-110235
[Patent Literature 9] Japanese Unexamined Patent Application Publication No. 2007-250288
[Patent Literature 10] Re-publication of PCT International Publication No. 2017-061464
[Patent Literature 11] Japanese Unexamined Patent Application Publication No. Hei 10-270076
[Patent Literature 12] Japanese Unexamined Patent Application Publication No. 2016-069328

SUMMARY OF INVENTION

Subject to be Resolved by the Invention

Among batteries using positive electrodes containing nickel, when a monochelate complex is used in a lithium ion battery whose cell potential reaches 4.1 V or more, the gas generation amount during a durability test (cycle test) is large compared to cases using a lithium cobaltate positive electrode or a lithium manganate positive electrode, and the results are not satisfactory. It is an object of the present invention to provide an electrolyte for a non-aqueous electrolyte battery that is used in such a battery and generates a small amount of gas during a durability test and a non-aqueous electrolyte battery using the electrolyte.

Means for Resolving the Subject to be Resolved by the Invention

The present inventors have intensively studied in view of such problems and, as a result, have found that, when an electrolyte for a non-aqueous electrolyte battery containing a non-aqueous organic solvent, an ionic salt including fluorine as a solute, and at least one monochelate complex as an additive selected from the group consisting of compounds represented by formulae (1) and (2) described below contains a predetermined amount of hydrogen fluoride, in a non-aqueous electrolyte battery comprising a positive electrode that includes at least one selected from the group consisting of oxides and phosphates, each containing nickel as a positive electrode active material, surprisingly, an effect of increasing the amount of the monochelate complex decomposed during the initial charge (consequently, an effect of suppressing the gas generation amount during a durability test) is obtained, and the present invention has been accomplished.

That is, the present invention relates to an electrolyte for a non-aqueous electrolyte battery comprising a positive electrode including, as a positive electrode active material, at least one selected from the group consisting of oxides containing nickel and phosphates containing nickel, the electrolyte for a non-aqueous electrolyte battery (hereinafter, may be simply referred to as "non-aqueous electrolyte" or "electrolyte") comprising:

(I) a non-aqueous organic solvent,
(II) a fluorine-containing solute being an ionic salt,
(III) at least one additive selected from the group consisting of compounds represented by formulae (1) and (2), and
(IV) hydrogen fluoride in an amount of 5 mass ppm or more and less than 200 mass ppm based on the total amount of the components (I), (II), and (III).

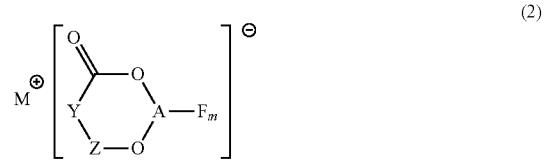

In the above formulae, M is an alkali metal, preferably lithium, potassium, or sodium, and particularly preferably lithium. In addition, A is boron or phosphorus. F represents fluorine, and O represents oxygen. When A is boron, m=2, and when A is phosphorus, m=4. V and W are each a carbonyl group, a methylene group, $C(CH_3)_2$, $C(CF_3)_2$, $CH(CF_3)$, $CH(CH_3)$, or $C(CH_3)(CF_3)$. Further, V and W may form one side of a cyclohexane ring, a cyclohexene ring, a cyclopentane ring, a cyclopentene ring, or an aromatic ring.

Y is a methylene group, a monofluoromethylene group, or a difluoromethylene group, and Z is a carbonyl group, $C(CF_3)_2$, $C(CH_3)_2$, $CH(CF_3)$, $CH(CH_3)$, $C(CH_3)(CF_3)$, or a methylene group. Further, Y and Z may form one side of a cyclohexane ring, a cyclohexene ring, a cyclopentane ring, a cyclopentene ring, or an aromatic ring.

Specifically, the compound represented by formula (1) is preferably at least one selected from the group consisting of the following compounds (1a) to (1p), in particular, the compounds (1a), (1d), (1e), (1f), (1g), (1h), (1i), (1m), (1o), and (1p) are preferable from the viewpoint of thermal stability of the compound, and further the compounds (1a), (1d), (1g), (1h), (1i), (1o), and (1p) are preferable from the viewpoint of the cost of the ligand.

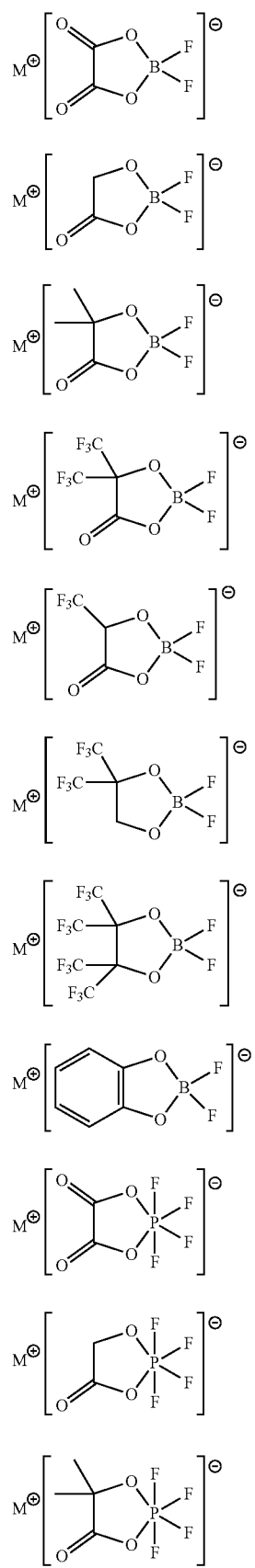
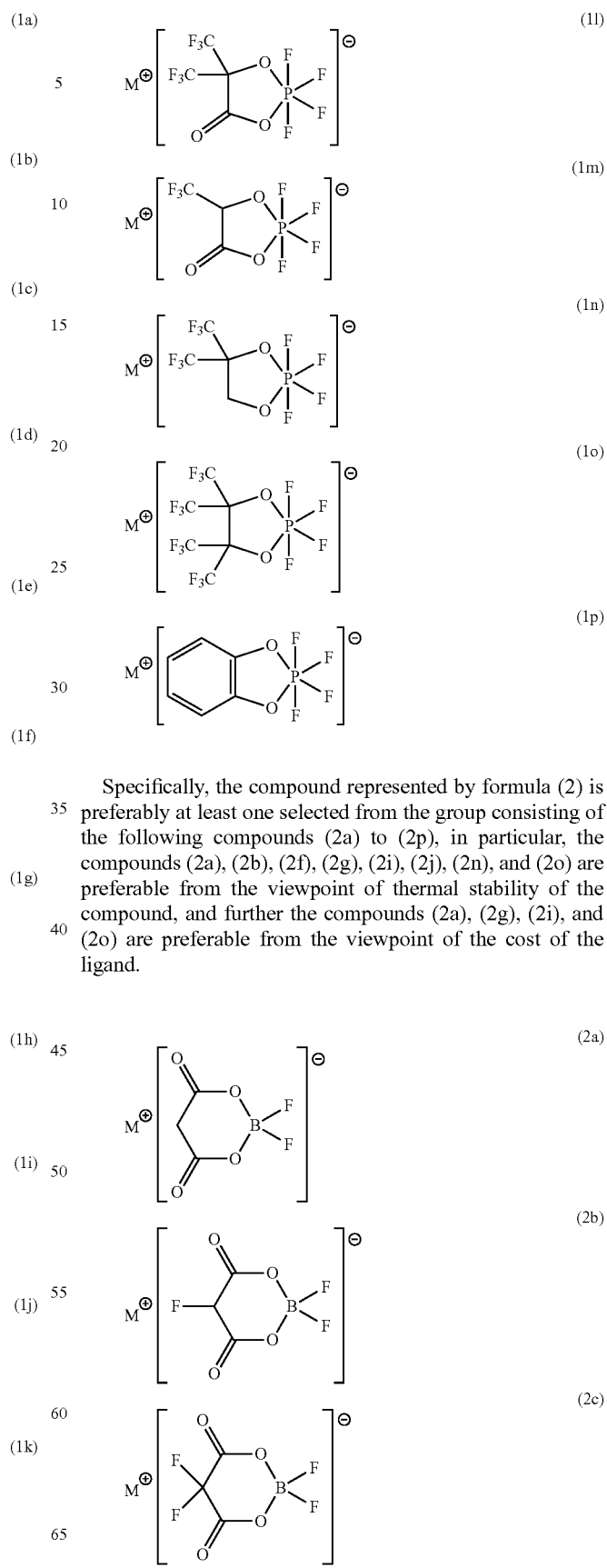
Specifically, the compound represented by formula (2) is preferably at least one selected from the group consisting of the following compounds (2a) to (2p), in particular, the compounds (2a), (2b), (2f), (2g), (2i), (2j), (2n), and (2o) are preferable from the viewpoint of thermal stability of the compound, and further the compounds (2a), (2g), (2i), and (2o) are preferable from the viewpoint of the cost of the ligand.
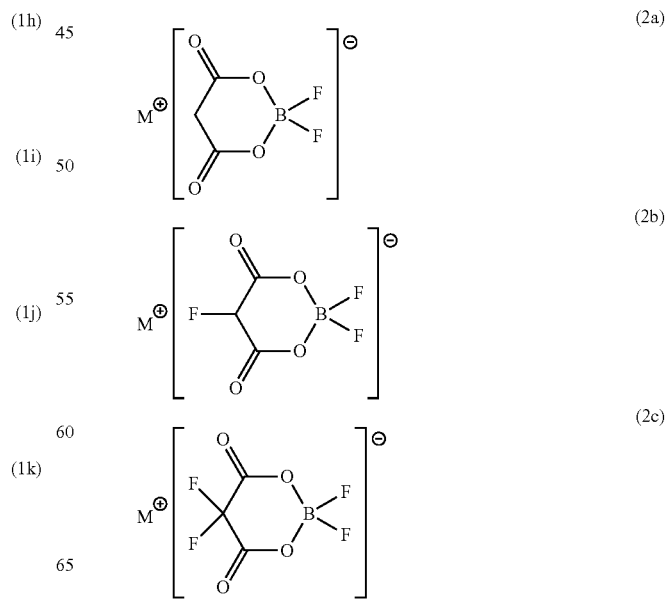

(2d) 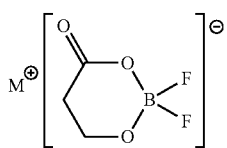

(2e) 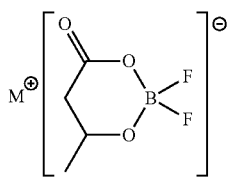

(2f) 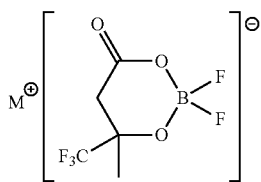

(2g) 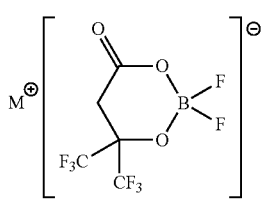

(2h) 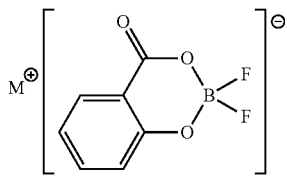

(2i) 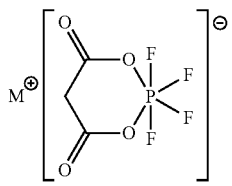

(2j) 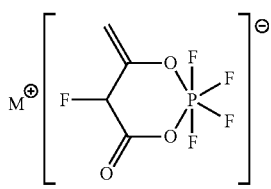

(2k) 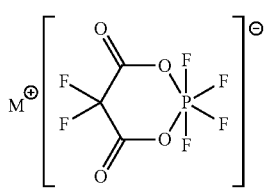

(2l) 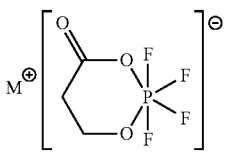

(2m) 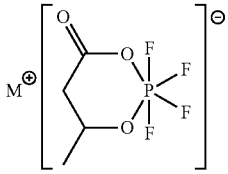

(2n) 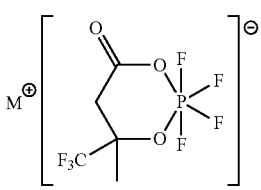

(2o) 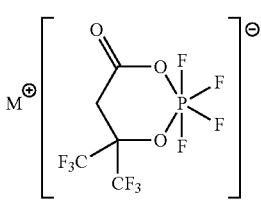

(2p) 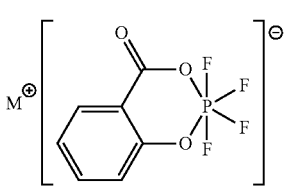

It is know that when a trace amount of water is present in an electrolyte for a non-aqueous electrolyte battery, the water reacts with a fluorine-containing electrolyte, such as $LiPF_6$, $LiBF_4$, and $LiAsF_6$, to generate hydrogen fluoride. The hydrogen fluoride causes dissolution of the positive electrode active material, corrosion of the current collector, and so on, and consequently leads to a reduction in the cycle characteristics of the battery or a reduction in the battery characteristics such as charge/discharge capacity and storage stability. Therefore, the lower the content of hydrogen fluoride, the more preferable. For example, Patent Literature 11 discloses that it is preferable that the concentration of hydrogen fluoride in an electrolyte is less than 30 mass ppm. However, it was found that when a predetermined amount of hydrogen fluoride is present in an electrolyte, surprisingly, an unexpected effect of activating the monochelate complex to improve the reactivity with a graphite-containing negative electrode is obtained, although the reason thereof is not clear.

Here, lithium bisoxalatoborate and lithium difluorobisoxalatophosphate in which two oxalic acid molecules as a bidentate ligand had been coordinated to $LiBF_4$ or $LiPF_6$, and further, lithium trisoxalatophosphate in which three oxalic acid molecules had been coordinated to $LiPF_6$, were also checked to see whether the addition of hydrogen fluoride similarly provided a decomposition-accelerating effect on a graphite-containing negative electrode, but it was observed that these compounds decomposed due to their reaction with hydrogen fluoride, and it was revealed that they lacked stability as electrolytes.

The present applicant disclosed in Patent Literature 12 that lithium trisoxalatophosphate is fluorinated by hydrogen fluoride and converted to lithium difluorobisoxalatophosphate, and it was confirmed this time that lithium bisoxalatoborate and lithium difluorobisoxalatophosphate also have the same tendency. In these cases, the ligand is oxalic acid, but in view of the strong binding energy between boron or phosphorus and fluorine, it is easily conjectured that, in general, a chelate complex in which a ligand is bonded to boron or phosphorus as a central element via oxygen easily reacts with hydrogen fluoride in the order of a tris form, a bis form, and a mono form. Accordingly, from the viewpoint of stability in an electrolyte, a mono form is used as the "additive (III)" in the electrolyte of the present invention.

Effects by the Invention

According to the present invention, it is possible to provide, an electrolyte for a non-aqueous electrolyte battery that generates a small amount of gas during a durability test even after reaching a cell potential of 4.1 V or more in a battery using a positive electrode containing nickel, by using:

the electrolyte comprising a non-aqueous organic solvent, a solute, an additive (monochelate complex) having a predetermined structure, and hydrogen fluoride in a predetermined concentration, shown as the above (I) to (IV), so that the hydrogen fluoride is effectively coordinated to the monochelate complex in the electrolyte to activate the monochelate complex; and the monochelate complex is efficiently decomposed on the negative electrode in the initial aging, as well as to provide, a non-aqueous electrolyte battery using the electrolyte.

DESCRIPTION OF EMBODIMENTS

Each of the configurations and combinations thereof in the following embodiments are merely examples, and additions, omissions, substitutions, and other modifications of the configurations are possible without departing from the gist of the present invention. In addition, the present invention is not limited to the embodiments and is limited only by the claims.

1. Electrolyte for Non-Aqueous Electrolyte Battery

The electrolyte for a non-aqueous electrolyte battery of the present invention at least contains:

(I) a non-aqueous organic solvent,
(II) a fluorine-containing solute being an ionic salt,
(III) at least one additive selected from the group consisting of compounds represented by the formulae (1) and (2) mentioned above; and
(IV) hydrogen fluoride in an amount of 5 mass ppm or more and less than 200 mass ppm based on the total amount of the components (I), (II), and (III).

If the content of hydrogen fluoride is less than 5 mass ppm, the effect of decomposing the monochelate complex in aging is insufficient, and if the content is 200 mass ppm or more, a very bad influence on the cycle characteristics is observed. More preferably, the range is 10 mass ppm or more for an increase in the effect, and is less than 150 mass ppm for a reduction in the bad influence on the cycle characteristics. Further preferably, the range is 15 mass ppm or more for a further increase in the effect, and is less than 100 mass ppm for a further reduction in the bad influence on the cycle characteristics. Particularly preferably, the range is 15 mass ppm or more for a further increase in the effect, and is less than 50 mass ppm for no bad influence on the cycle characteristics. In addition, the hydrogen fluoride may be directly added to the electrolyte or may be indirectly added by using a non-aqueous organic solvent, solute, or additive containing hydrogen fluoride, as a raw material. Alternately, the hydrogen fluoride may be that generated by hydrolysis of the fluorine-containing solute, or an additive in the electrolyte.

Regarding Non-Aqueous Organic Solvent (I)

The type of the non-aqueous organic solvent to be used in the electrolyte for a non-aqueous electrolyte battery of the present invention is not particularly limited, and any type of non-aqueous organic solvents can be used. Specifically, the non-aqueous organic solvent is preferably at least one selected from the group consisting of esters, such as ethyl methyl carbonate (hereinafter referred to as "EMC"), dimethyl carbonate (hereinafter referred to as "DMC"), diethyl carbonate (hereinafter referred to as "DEC"), methyl propyl carbonate, ethyl propyl carbonate, methyl butyl carbonate, 2,2,2-trifluoroethyl methyl carbonate, 2,2,2-trifluoroethyl ethyl carbonate, 2,2,2-trifluoroethyl propyl carbonate, bis(2,2,2-trifluoroethyl) carbonate, 1,1,1,3,3,3-hexafluoro-1-propyl methyl carbonate, 1,1,1,3,3,3-hexafluoro-1-propyl ethyl carbonate, 1,1,1,3,3,3-hexafluoro-1-propyl propyl carbonate, bis(1,1,1,3,3,3-hexafluoro-1-propyl) carbonate, ethylene carbonate (hereinafter referred to as "EC"), propylene carbonate (hereinafter referred to as "PC"), butylene carbonate, fluoroethylene carbonate (hereinafter referred to as "FEC"), difluoroethylene carbonate, methyl acetate, ethyl acetate, methyl propionate, ethyl propionate, methyl 2-fluoropropionate, and ethyl 2-fluoropropionate; and diethyl ether, dibutyl ether, diisopropyl ether, 1,2-dimethoxyethane, tetrahydrofuran, 2-methyl tetrahydrofuran, furan, tetrahydropyran, 1,3-dioxane, 1,4-dioxane, N,N-dimethylformamide, acetonitrile, propionitrile, dimethyl sulfoxide, sulfolane, γ-butyrolactone, and γ-valerolactone.

In addition, the non-aqueous organic solvent is preferably at least one selected from the group consisting of cyclic carbonates and chain carbonates because of its excellent cycle characteristics at high temperatures. Alternatively, the non-aqueous organic solvent is preferably at least one selected from the group consisting of esters because of its excellent input and output characteristics at low temperatures.

Preferable examples of the cyclic carbonate include EC, PC, butylene carbonate, and FEC, and at least one selected from the group consisting of EC, PC, and FEC is particularly preferred.

Examples of the chain carbonate include EMC, DMC, DEC, methyl propyl carbonate, ethyl propyl carbonate, 2,2,2-trifluoroethyl methyl carbonate, 2,2,2-trifluoroethyl ethyl carbonate, 1,1,1,3,3,3-hexafluoro-1-propyl methyl carbonate, and 1,1,1,3,3,3-hexafluoro-1-propyl ethyl carbonate, and at least one selected from the group consisting of EMC, DMC, DEC, and methyl propyl carbonate is particularly preferred.

In addition, preferable examples of the esters include methyl acetate, ethyl acetate, methyl propionate, ethyl propionate, methyl 2-fluoropropionate, and ethyl 2-fluoropropionate.

The electrolyte for a non-aqueous electrolyte battery of the present invention may include a polymer, and such an electrolyte is generally called a polymer solid electrolyte. Examples of the polymer solid electrolyte include those containing the non-aqueous organic solvent as a plasticizer.

The polymer may be any aprotic polymer that can dissolve the solute and the additive, and examples thereof include polymers having a polyethylene oxide as a main chain or side chain, homopolymers or copolymers of polyvinylidene fluoride, methacrylic acid ester polymers, and polyacrylonitriles. When a plasticizer is added to such a polymer, among the above-mentioned non-aqueous organic solvents, an aprotic non-aqueous organic solvent is preferred.

Regarding solute (II)

The solute to be used is preferably an ionic salt composed of a pair of, for example, at least one cation selected from the group consisting of alkali metal ions with at least one anion selected from the group consisting of a hexafluorophosphate anion, a tetrafluoroborate anion, a trifluoromethanesulfonate anion, a fluorosulfonate anion, a bis(trifluoromethanesulfonyl)imide anion, a bis(fluorosulfonyl)imide anion, a (trifluoromethanesulfonyl)(fluorosulfonyl)imide anion, a bis(difluorophosphoryl)imide anion, a (difluorophosphoryl)(fluorosulfonyl)imide anion, and a (difluorophosphoryl)(trifluoromethanesulfonyl)imide anion.

Further, in the ionic salt which is the solute, it is preferable that the cation is lithium, sodium, or potassium and the anion is at least one selected from the group consisting of a hexafluorophosphate anion, a tetrafluoroborate anion, a trifluoromethanesulfonate anion, a bis(trifluoromethanesulfonyl)imide anion, a bis(fluorosulfonyl)imide anion, and a bis(difluorophosphoryl)imide anion, because of its high solubility in the non-aqueous organic solvent and the electrochemical stability.

The concentration of the solute is not particularly limited, and the lower limit of the concentration is 0.5 mol/L or more, preferably 0.7 mol/L or more, and further preferably 0.9 mol/L or more, and the upper limit is 2.5 mol/L or less, preferably 2.2 mol/L or less, and further preferably 2.0 mol/L or less. When the concentration is lower than 0.5 mol/L, the ion conductivity is reduced to reduce the cycle characteristics and the output characteristics of the non-aqueous electrolyte battery. In contrast, when the concentration is higher than 2.5 mol/L, the viscosity of the electrolyte for a non-aqueous electrolyte battery is increased to reduce the ion conductivity, resulting in a risk of reducing the cycle characteristics and the output characteristics of the non-aqueous electrolyte battery. In addition, these solutes may be used alone or in a combination of two or more thereof.

If a large amount of the solute is dissolved in a non-aqueous organic solvent at once, the temperature of the non-aqueous electrolyte may be raised due to the heat of the solution of the solute. If the solution temperature is significantly raised, the decomposition of the solute and the solvent proceeds, resulting in a risk of causing coloring or a reduction in the performance of the electrolyte for a non-aqueous electrolyte battery. Accordingly, although the solution temperature when the solute is dissolved in the non-aqueous organic solvent is not particularly limited, the solution temperature is preferably −20° C. to 50° C. and more preferably 0° C. to 40° C.

In the non-aqueous electrolyte, the concentration of the component (III), based on the total amount of the components (I), (II), and (III) is preferably within a range of 0.01 mass % or more and 7.0 mass % or less, more preferably 0.1 mass % or more and 5.0 mass % or less, and further preferably 0.5 mass % or more and 4.0 mass % or less. When the concentration is lower than 0.01 mass %, the effect of improving the characteristics of the non-aqueous electrolyte battery may not be sufficiently obtained. In contrast, when the concentration is higher than 7.0 mass %, the durability-improving effect is significantly high, but the initial capacity may be drastically reduced.

Regarding Additional Components

As long as the gist of the present invention is not impaired, the electrolyte for a non-aqueous electrolyte battery of the present invention may further comprise any additional components that are generally used at any ratio. Examples of the additional components include compounds having an overcharge-preventing effect, a negative electrode film-forming effect, or a positive electrode-protecting effect, such as cyclohexylbenzene, cyclohexylfluorobenzene, fluorobenzene, biphenyl, difluoroanisole, tert-butylbenzene, tert-amylbenzene, 2-fluorotoluene, 2-fluorobiphenyl, vinylene carbonate, dimethyl vinylene carbonate, vinyl ethylene carbonate, fluoroethylene carbonate, methyl propargyl carbonate, ethyl propargyl carbonate, dipropargyl carbonate, maleic anhydride, succinic anhydride, propanesultone, 1,3-propanesultone, butanesultone, methylene methanedisulfonate, dimethylene methanedisulfonate, trimethylene methanedisulfonate, compounds represented by the following formula (3) (e.g., a compound in which $R^1$ is an ethylene group (hereinafter, may be referred to as "Dod"), a compound in which $R^1$ is a propylene group, a compound in which $R^1$ is a butylene group, a compound in which $R^1$ is a pentylene group, and a compound in which $R^1$ is a —CH$_2$—CH(C$_3$H$_7$)-group (hereinafter may be referred to as "pDod")), compounds represented by the following formula (4), methyl methanesulfonate, lithium difluorobis(oxalato)phosphate (hereinafter, may be referred to as LDFBOP), sodium difluorobis(oxalato)phosphate, potassium difluorobis(oxalato)phosphate, lithium bis(oxalato)borate, sodium bis(oxalato)borate, potassium bis(oxalato)borate, lithium tris(oxalato)phosphate, lithium difluorophosphate (hereinafter, may be referred to as LiPO$_2$F$_2$), lithium fluorophosphate, ethenesulfonyl fluoride, benzenesulfonyl fluoride, trifluoromethanesulfonyl fluoride, methanesulfonyl fluoride (hereinafter, may be referred to as MSF), ethanesulfonyl fluoride (hereinafter, may be referred to as EtSF), 1,2-bis(fluorosulfonyl)benzene (hereinafter, may be referred to as 1,2-BFSB), 1,3-bis(fluorosulfonyl)benzene (hereinafter, may be referred to as 1,3-BFSB), 1,4-bis(fluorosulfonyl)benzene, fluorinated 4-fluoropsulfonyl, fluorinated 4-tert-butylphenylsulfonyl, fluorinated 4-tert-amylphenylsulfonyl, fluorinated 2-methylphenylsulfonyl, phenyl difluorophosphate (hereinafter, may be referred to as PDFP), and lithium ethylfluorophosphate.

The contents of these additional components in the electrolytes are preferably 0.01 mass % or more and 8.00 mass % or less.

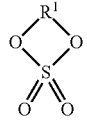

(3)

[In formula (3), $R^1$ is a hydrocarbon group having 2 to 5 carbon atoms and may have a branched structure when the number of carbon atoms is 3 or more. In addition, the hydrocarbon group may include a halogen atom, a heteroatom, or an oxygen atom.]

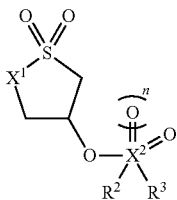

(4)

[In formula (4), $X^1$ is an oxygen atom or a methylene group optionally substituted with a halogen atom, and $X^2$ is a phosphorus atom or a sulfur atom. n is 0 when $X^2$ is a phosphorus atom and is 1 when $X^2$ is a sulfur atom. $R^2$ and $R^3$ are each independently a halogen atom or an alkyl group, alkenyl group, or aryl group optionally substituted with a halogen atom. Incidentally, when $X^2$ is a sulfur atom, $R^3$ is not present.]

Preferable examples of the compound represented by the formula (4) include the following compounds (4-1) to (4-4).

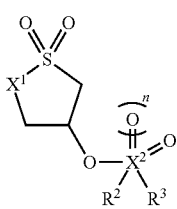

(4-1)

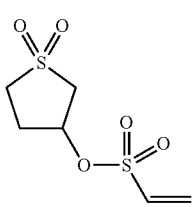

(4-2)

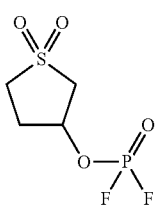

(4-3)

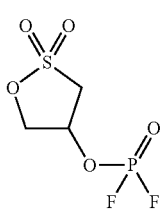

(4-4)

Further, the ionic salt mentioned as a solute can exhibit the negative electrode film-forming effect or the positive electrode-protecting effect as an "additional component" when the content in the electrolyte is lower than 0.5 mol/L which is the lower limit of the suitable concentration of the solute. In such a case, the content in the electrolyte is preferably 0.01 mass % or more and 5.0 mass % or less. Examples of the ionic salt in such a case include lithium trifluoromethanesulfonate, sodium trifluoromethanesulfonate, potassium trifluoromethanesulfonate, lithium fluorosulfonate, sodium fluorosulfonate, potassium fluorosulfonate, lithium bis(trifluoromethanesulfonyl)imide, sodium bis(trifluoromethanesulfonyl)imide, potassium bis(trifluoromethanesulfonyl)imide, lithium bis(fluorosulfonyl)imide, sodium bis(fluorosulfonyl)imide, potassium bis(fluorosulfonyl)imide, lithium (trifluoromethanesulfonyl)(fluorosulfonyl)imide, sodium (trifluoromethanesulfonyl)(fluorosulfonyl)imide, potassium (trifluoromethanesulfonyl)(fluorosulfonyl)imide, lithium bis(difluorophosphoryl)imide, sodium bis(difluorophosphoryl)imide, potassium bis(difluorophosphoryl)imide, lithium (difluorophosphoryl)(fluorosulfonyl)imide, sodium (difluorophosphoryl)(fluorosulfonyl)imide, potassium (difluorophosphoryl)(fluorosulfonyl)imide, lithium (difluorophosphoryl)(trifluoromethanesulfonyl)imide, sodium (difluorophosphoryl)(trifluoromethanesulfonyl)imide, and potassium (difluorophosphoryl)(trifluoromethanesulfonyl)imide.

It is preferable to include at least one compound of the compounds having an O=S—F bond and the compounds having an O=P—F bond among the above-mentioned compounds as an additional component, because decomposition of the monochelate complex is not inhibited and the durability-improving effect due to the combination use is particularly high.

Preferable examples of the compound having an O=S—F bond include lithium bis(fluorosulfonyl)imide, lithium (trifluoromethanesulfonyl)(fluorosulfonyl)imide, lithium (fluorosulfonyl)(difluorophosphoryl)imide, lithium fluorosulfonate, propyl fluorosulfate, ethenesulfonyl fluoride, benzenesulfonyl fluoride, trifluoromethanesulfonyl fluoride, MSF, EtSF, 1,2-BF SB, 1,3-BF SB, fluorinated 4-fluorophenylsulfonyl, fluorinated 4-tert-butylphenylsulfonyl, fluorinated 4-tert-amylphenylsulfonyl, and fluorinated 2-methylphenylsulfonyl. In particular, preferred is at least one selected from the group consisting of lithium bis(fluorosulfonyl)imide, lithium (trifluoromethanesulfonyl)(fluorosulfonyl)imide, lithium fluorosulfonate, MSF, EtSF, 1,2-BFSB, and 1,3-BFSB.

Examples of the compound having an O=P—F bond include lithium (difluorophosphoryl)(trifluoromethanesulfonyl)imide, lithium bis(difluorophosphoryl)imide, lithium difluorophosphate, lithium fluorophosphate, lithium methylphosphate, lithium ethylfluorophosphate, lithium propylphosphate, and PDFP. In particular, preferred is at least one selected from the group consisting of lithium bis(difluorophosphoryl)imide, lithium difluorophosphate, lithium fluorophosphate, lithium ethylfluorophosphate, and PDFP.

Further, it is particularly preferred that the component (III) is at least one of the above-mentioned (1a) and (1i), the compound having an O=S—F bond is at least one selected from the group consisting of lithium bis(fluorosulfonyl)imide, lithium (trifluoromethanesulfonyl)(fluorosulfonyl)imide, lithium fluorosulfonate, MSF, EtSF, 1,2-BF SB, and 1,3-BFSB, and the compound having an O=P—F bond is at least one selected from the group consisting of lithium bis(difluorophosphoryl)imide, lithium difluorophosphate, lithium fluorophosphate, lithium ethylfluorophosphate, and PDFP, because the battery performance is highly improved and the cost effectiveness calculated from the manufacturing cost of each compound is high.

Furthermore, the electrolyte for a non-aqueous electrolyte battery pseudo-solidified with a gelling agent or a cross-linking polymer can also be used in the same manner as in the case of a non-aqueous electrolyte battery called a polymer battery.

2. Non-Aqueous Electrolyte Battery

The non-aqueous electrolyte battery of the present invention at least comprises (i) the electrolyte for a non-aqueous electrolyte battery, (ii) a positive electrode including at least one selected from the group consisting of oxides and phosphates each containing nickel as a positive electrode active material, and (iii) a negative electrode. Furthermore, it is preferable to include, for example, (iv) a separator and an outer case.

[Positive Electrode (ii)]

The positive electrode (ii) includes at least one positive electrode active material selected from the group consisting of oxides containing nickel and phosphates containing nickel.

[Positive Electrode Active Material]

In a lithium ion secondary battery in which the main cation in the non-aqueous electrolyte is lithium, the positive electrode active material constituting the positive electrode (ii) may be any type of materials so long as such materials include at least one selected from the group consisting of oxides containing nickel and phosphates containing nickel and are chargeable and dischargeable, and examples of the materials include those containing at least one selected from (A) lithium-transition metal composite oxides containing nickel or one or more metals selected from the group consisting of manganese, cobalt, and aluminum in addition to nickel and having a layer structure, (B) lithium-manganese composite oxides having a spinel structure and containing nickel, (C) lithium-containing olivine type phosphates containing nickel, and (D) lithium-excess layered transition metal oxides having a layered rock type salt structure and containing nickel.

((A) Lithium-Transition Metal Composite Oxide) Positive Electrode Active Material (A)

Preferable examples of the lithium-transition metal composite oxide containing nickel or one or more metals selected from the group consisting of manganese, cobalt, and aluminum in addition to nickel and having a layer structure include lithium-nickel composite oxides, lithium-nickel-cobalt composite oxides, lithium-nickel-cobalt-aluminum composite oxides, lithium-nickel-manganese composite oxides, and lithium-nickel-manganese-cobalt composite oxides. In addition, those obtained by substituting a part of the transition metal atoms that are the main components of these lithium-transition metal composite oxides with other elements such as Al, Ti, V, Cr, Fe, Cu, Zn, Mg, Ga, Zr, Si, B, Ba, Y, and Sn, may be used.

As the lithium-nickel composite oxide, specifically, those prepared by partially coating, with aluminum oxide, the particle surfaces of $LiNiO_2$ or $LiNiO_2$ particle powder in which a heterogenous element such as Mg, Zr, Al, or Ti is added to lithium nickelate may be used.

The lithium-nickel-cobalt composite oxide and the lithium-nickel-cobalt-aluminum composite oxide are represented by the following formula [1-1]:

$$Li_aNi_{1-b-c}Co_bM^1_cO_2 \qquad [1\text{-}1]$$

In formula [1-1], $M^1$ is at least one element selected from the group consisting of Al, Fe, Mg, Zr, Ti, and B; and a satisfies 0.9≤a≤1.2, and b and c satisfy the requirements: 0.1≤b≤0.3, and 0≤c≤0.1.

These composite oxides can be prepared in accordance with, for example, the manufacturing method described in Japanese Unexamined Patent Application Publication No. 2009-137834. Specifically, preferable examples thereof include $LiNi_{0.8}Co_{0.2}O_2$, $LiNi_{0.85}Co_{0.10}Al_{0.05}O_2$, $LiNi_{0.87}Co_{0.10}Al_{0.03}O_2$, and $LiNi_{0.6}Co_{0.3}Al_{0.1}O_2$.

Examples of the lithium-nickel-manganese composite oxide include $LiNi_{0.5}Mn_{0.5}O_2$ and $LiCo_{0.5}Mn_{0.5}O_2$.

Examples of the lithium-nickel-manganese-cobalt composite oxide include lithium-containing composite oxides represented by the following formula [1-2]:

$$Li_dNi_eMn_fCo_gM^2_hO_2 \qquad [1\text{-}2]$$

In formula [1-2], $M^2$ is at least one element selected from the group consisting of Al, Fe, Mg, Zr, Ti, B, and Sn; and d satisfies 0.9≤d≤1.2, and e, f, g, and h satisfy the requirements: e+f+g+h=1, 0≤e≤0.7, 0≤f≤0.5, 0≤g≤0.5, and h≥0.

The lithium-nickel-manganese-cobalt composite oxide preferably contains manganese within the range shown by formula [1-2] for increasing the structural stability and improving the safety at high temperatures in a lithium secondary battery, and more preferably further contains cobalt within the range shown by formula [1-2] for particularly enhancing high efficiency characteristics of the lithium ion secondary battery.

Specifically, preferable examples thereof include $Li[Ni_{1/3}Mn_{1/3}Co_{1/3}]O_2$, $Li[Ni_{0.45}Mn_{0.35}Co_{0.2}]O_2$, $Li[Ni_{0.5}Mn_{0.3}Co_{0.2}]O_2$, $Li[Ni_{0.6}Mn_{0.2}Co_{0.2}]O_2$, $Li[Ni_{0.49}Mn_{0.3}Co_{0.2}Zr_{0.01}]O_2$, and $Li[Ni_{0.49}Mn_{0.3}Co_{0.2}Mg_{0.01}]O_2$ having a charge/discharge range of 4.3 V or more.

((B) Lithium Manganese Composite Oxide Having Spinel Structure)

Positive Electrode Active Material (B)

Examples of the lithium-manganese composite oxide having a spinel structure include spinel type lithium-manganese composite oxides represented by the following formula [1-3]:

$$Li_j(Mn_{2-k}M^3_k)O_4 \qquad [1\text{-}3]$$

In formula [1-3], $M^3$ includes Ni and optionally includes at least one metal element selected from the group consisting of Co, Fe, Mg, Cr, Cu, Al, and Ti; j satisfies 1.05≤j≤1.15; and k satisfies 0<k≤0.20.

Specifically, examples of the lithium-manganese composite oxide include $LiMn_{1.9}Ni_{0.1}O_4$ and $LiMn_{1.5}Ni_{0.5}O_4$.

((C) Lithium-Containing Olivine Type Phosphate)

Positive Electrode Active Material (C)

Examples of the lithium-containing olivine type phosphate include those represented by the following formula [1-4]:

$$LiFe_{1-n}M^4_nPO_4 \qquad [1\text{-}4]$$

In formula [1-4], $M^4$ includes Ni and also at least one selected from Co, Mn, Cu, Zn, Nb, Mg, Al, Ti, W, Zr, and Cd; and n satisfies 0<n≤1.

Specifically, preferable examples thereof include $LiNiPO_4$.

((D) Lithium-Excess Layered Transition Metal Oxide) Positive Electrode Active Material (D)

Examples of the lithium-excess layered transition metal oxide having a layered rock type salt structure include those represented by the following formula [1-5]:

$$xLiM^5O_2 \cdot (1-x)Li_2M^6O_3 \qquad [1\text{-}5]$$

In formula [1-5], x is a number satisfying 0<x<1; $M^5$ is at least one metal element having an average oxidation number of 3'; and $M^6$ is at least one metal element having an average oxidation number of 4. In formula [1-5], $M^5$ is preferably a trivalent metal element selected from Mn, Ni, Co, Fe, V, and Cr, or may be trivalent as an average oxidation number with the same amount of divalent and tetravalent metals.

In addition, in formula [1-5], $M^5$ is preferably one or more metal elements selected from Mn, Zr, and Ti. Further, either $M^5$ or $M^5$ necessarily includes nickel. Specifically, preferable examples thereof include $0.5[LiNi_{0.5}Mn_{0.5}O_2]$. $0.5[Li_2MnO_3]$, $0.5[LiNi_{1/3}Co_{1/3}Mn_{1/3}O_2].0.5[Li_2MnO_3]$, $0.5[LiNi_{0.375}Co_{0.25}Mn_{0.375}O_2].0.5[Li_2MnO_3]$, $0.5[LiNi_{0.375}Co_{0.125}Fe_{0.125}Mn_{0.375}O_2].0.5[Li_2MnO_3]$, and $0.45[LiNi_{0.375}Co_{0.25}Mn_{0.375}O_2].0.10[Li_2TiO_3].0.45[Li_2MnO_3]$.

It is known that the positive electrode active material (D) represented by the above formula [1-5] exhibits a high capacity with high-voltage charging at 4.4 V or more (relative to Li). (For example, U.S. Pat. No. 7,135,252).

These positive electrode active materials can be prepared in accordance with the manufacturing method described in, for example, Japanese Unexamined Patent Application Publication No. 2008-270201, WO 2013/118661, or Japanese Unexamined Patent Application Publication No. 2013-030284.

It is sufficient that the positive electrode active material contains at least one selected from the above-mentioned materials (A) to (D) as a main component. The positive electrode active material may also contain another material, and examples of such material include transition element chalcogenides such as $FeS_2$, $TiS_2$, $TiO_2$, $V_2O_5$, $MoO_3$, and $MoS_2$; conductive polymers such as polyacetylene, polyparaphenylene, polyaniline, and polypyrrole; activated carbon; polymers generating radicals; and carbon materials.

[Positive Electrode Current Collector]

The positive electrode (ii) includes a positive electrode current collector. As the positive electrode current collector, for example, aluminum, stainless steel, nickel, or titanium, or an alloy thereof can be used.

[Positive Electrode Active Material Layer]

In the positive electrode (ii), for example, a positive electrode active material layer is formed on at least one surface of the positive electrode current exhibits a high capacity with high-voltage charging at 4.4 V or more (relative to Li). (For example, U.S. Pat. No. 7,135,252).

These positive electrode active materials can be prepared in accordance with the manufacturing method described in, for example, Japanese Unexamined Patent Application Publication No. 2008-270201, WO 2013/118661, or Japanese Unexamined Patent Application Publication No. 2013-030284.

It is sufficient that the positive electrode active material contains at least one selected from the above-mentioned materials (A) to (D) as a main component. The positive electrode active material may also contain another material, and examples of such material include transition element chalcogenides such as $FeS_2$, $TiS_2$, $TiO_2$, $V_2O_5$, $MoO_3$, and $MoS_2$; conductive polymers such as polyacetylene, polyparaphenylene, polyaniline, and polypyrrole; activated carbon; polymers generating radicals; and carbon materials.

[Positive Electrode Current Collector]

The positive electrode (ii) includes a positive electrode current collector. As the positive electrode current collector, for example, aluminum, stainless steel, nickel, or titanium, or an alloy thereof can be used.

[Positive Electrode Active Material Layer]

In the positive electrode (ii), for example, a positive electrode active material layer is formed on at least one surface of the positive electrode current collector. The positive electrode active material layer is composed of, for example, the above-described positive electrode active material, a binder, and optionally a conductive agent.

Examples of the binder include polytetrafluoroethylene, polyvinylidene fluoride, tetrafluoroethylene-perfluoroalkyl vinyl ether copolymer, styrene butadiene rubber (SBR), carboxymethyl cellulose, methyl cellulose, cellulose acetate phthalate, hydroxypropyl methyl cellulose, and polyvinyl alcohol.

As the conductive agent, for example, carbon materials such as acetylene black, Ketjen black, furnace black, carbon fiber, graphite (granular graphite and flake graphite), and fluorinated graphite can be used. In the positive electrode, for example, acetylene black and Ketjen black having low crystallinity are preferably used.

[Negative Electrode (iii)]

The negative electrode material is not particularly limited. In lithium batteries and lithium ion batteries, for example, various carbon materials (such as artificial graphite and natural graphite), mixtures of a carbon material with a metal oxide, a metal nitride, tin (simple substance), a tin compound, silicon (simple substance), a silicon compound, and conductive polymers, and activated carbon can be used.

The carbon material is, for example, easily graphitizable carbon, hardly graphitizable carbon (hard carbon) having an interplanar distance between the (002) planes of 0.37 nm or more, or a graphite having an interplanar distance between the (002) planes of 0.34 nm or less. More specifically, pyrolytic carbon, cokes, glassy carbon fiber, organic polymer compound fired body, activated carbon, carbon blacks, etc., are exemplified. Among these materials, the cokes include pitch coke, needle coke, and petroleum coke. The organic polymer compound fired body refers to a carbonized product prepared by firing phenol resin, furan resin, and the like at an appropriate temperature. The carbon material is preferred because it very rarely changes the crystal structure with the occlusion and release of lithium, to provide a high energy density and excellent cycle characteristics. Incidentally, the shape of the carbon material may be any one of fibrous, spherical, granular, and scale-like shapes. In addition, amorphous carbon and a graphite material having a surface coated with amorphous carbon are more preferred because they reduce the reactivity between the material surface and the electrolyte.

The negative electrode (iii) preferably includes at least one negative electrode active material.

[Negative Electrode Active Material]

In a lithium ion secondary battery in which the main cation in the non-aqueous electrolyte is lithium, the negative electrode active material constituting the negative electrode (iii) is a material that can dope and de-dope lithium ions, and examples thereof include carbon materials (E) whose d-value of the lattice plane (002 plane) is 0.340 nm or less in X-ray diffraction and carbon materials (F) whose d-value of the lattice plane (002 plane) exceeds 0.340 nm in X-ray diffraction. These negative electrode active materials may be used alone or in combination of two or more thereof.

(Carbon Material (E) Having a d-Value of the Lattice Plane (002 Plane) of 0.340 nm or Less in X-Ray Diffraction) Negative Electrode Active Material (E)

Examples of the carbon material whose d-value of the lattice plane (002 plane) is 0.340 nm or less in X-ray diffraction include pyrolytic carbons, cokes (e.g., pitch coke, needle coke, and petroleum coke), graphites, organic polymer compound fired bodies (e.g., a carbonized product prepared by firing phenol resin, furan resin, and the like at an appropriate temperature), carbon fiber, and activated carbon, and these carbon materials may be graphitized. The carbon material is a material having an interplanar distance between the (002) planes (d002) of 0.340 nm or less measured by an X-ray diffraction method. In particular, graphite having a true density of 1.70 g/cm³ or more or a highly crystalline carbon material having properties similar to the graphite are preferred.

(Carbon Material (F) Having a d-Value of the Lattice Plane (002 Plane) Exceeding 0.340 nm in X-Ray Diffraction)

Negative Electrode Active Material (F)

Examples of the carbon material whose d-value of the lattice plane (002 plane) exceeds 0.340 nm in X-ray diffraction include amorphous carbon, and this carbon material is one that rarely changes the lamination order even if subjected to heat treatment at a high temperatures of 2000° C. or more, such as hardly graphitizable carbon (hard carbon), mesocarbon microbeads (MCMB) fired at 1500° C. or less, and mesophase bitch carbon fiber (MCF). Carbotron (registered trademark) P, manufactured by Kureha Corporation, is a typical example.

[Negative Electrode Current Collector]

The negative electrode (iii) includes a negative electrode current collector. As the negative electrode current collector, for example, copper, stainless steel, nickel, titanium, or an alloy thereof can be used.

[Negative Electrode Active Material Layer]

In the negative electrode (iii), for example, a negative electrode active material layer is formed on at least one surface of the negative electrode current collector. The negative electrode active material layer is composed of, for example, the above-described negative electrode active material, a binder, and optionally a conductive agent.

Examples of the binder include polytetrafluoroethylene, polyvinylidene fluoride, tetrafluoroethylene-perfluoroalkyl-vinyl ether copolymer, styrene butadiene rubber (SBR), carboxymethyl cellulose, methyl cellulose, cellulose acetate phthalate, hydroxypropyl methyl cellulose, and polyvinyl alcohol.

As the conductive agent, for example, carbon materials such as acetylene black, Ketjen black, furnace black, carbon fiber, graphite (granular graphite and flake graphite), and fluorinated graphite can be used.

[Method for Manufacturing Electrodes (Positive Electrode (ii) and Negative Electrode (iii))]

An electrode can be prepared by, for example, dispersing and kneading an active material, a binder, and optionally a conductive agent at a predetermined mixing ratio in a solvent, such as N-methyl-2-pyrrolidone (NMP) or water, applying the resulting paste to a current collector, and drying it to form an active material layer. The resulting electrode is preferably compressed by a method such as roll pressing to adjust the density of the electrode to an appropriate level.

[Separator (iv)]

The above non-aqueous electrolyte battery can include a separator (iv). As a separator for preventing contact between the positive electrode (ii) and the negative electrode (iii), a polyolefin, such as polypropylene or polyethylene, cellulose, paper, or a non-woven cloth or porous sheet made of, for example, glass fiber, is used. These films are preferably microporous so that the electrolyte permeates to make ions easily pass therethrough.

Examples of the polyolefin separator include films that electrically insulate between the positive electrode and the negative electrode and allow lithium ions to pass therethrough, such as microporous polymer films such as a porous polyolefin film. As a specific example of the porous polyolefin film, for example, a porous polyethylene film may be used alone, or a multilayer film in which a porous polyethylene film and a porous polypropylene film are stacked may be used. In addition, a composite film of a porous polyethylene film and a polypropylene film is another example.

The above-described non-aqueous electrolyte of the present invention is impregnated and held in the separator. The impregnation method is not particularly limited and may be a known method. Specifically, the impregnation can be achieved by finally filling a battery including a positive electrode, a separator, and a negative electrode with an electrolyte.

[Outer Case]

In configuration of a non-aqueous electrolyte battery, as the outer case of the non-aqueous electrolyte battery, for example, a metal can in a shape of, for example, a coin, cylinder, or square shape, or a laminated outer case can be suitably used. Preferable examples of the material of the metal can include nickel-plated steel, stainless steel, nickel-plated stainless steel, aluminum or an alloy thereof, nickel, and titanium. As the laminated outer case, for example, an aluminum laminate film, a stainless steel (SUS) laminate film, or a laminate film of, for example, a silica-coated polypropylene or polyethylene can be used.

The configuration of the non-aqueous electrolyte battery according to the present embodiment is not particularly limited, and, for example, the battery can be configured such that an electrode element comprising a positive electrode and a negative electrode disposed opposite to each other and a non-aqueous electrolyte are disposed in an outer case. The non-aqueous electrolyte battery may have any shape, and an electrochemical device having a coin, cylinder, square, or aluminum laminate sheet-like shape is assembled from the above-mentioned elements.

The method for manufacturing the non-aqueous electrolyte battery of the present invention preferably includes:

a step of assembling a cell by impregnating a separator with the electrolyte for a non-aqueous electrolyte battery and disposing the separator between a negative electrode and a positive electrode including at least one selected from the group consisting of oxides and phosphates each containing nickel as a positive electrode active material; and a step of adjusting the cell potential to 1.5 V or more and 4.5 V or less to decompose the above-mentioned component (III) on the electrodes.

Reference Example

A lithium ion secondary battery was assembled from an electrolyte containing 2.0 mass % of LDFOB, a graphite-containing negative electrode, an NCM positive electrode (the mass ratio of Ni:Co:Mn was 6:2:2), and a polyethylene separator based on the method disclosed in Patent Literature 9, and was subjected to aging by increasing the voltage up to 3.5 V at 0.2 C and then leaving to stand at 60° C. for 48 hours. Subsequently, the voltage was increased up to 4.3 V, and discharge was further performed down to 3.0 V to complete the initial charge and discharge. Subsequently, the charge and discharge between 3.0 V and 4.3 V were performed at 25° C. for 5 times to stabilize the cell. The gas generated inside the battery up to this time point was removed, then a cycle test was performed 700 times, and the amount of gas generated inside the battery thereby was measured by the Archimedes method. As a result, the amount of gas was decreased by about 15% compared to a battery not subjected to aging during the initial charge. (Incidentally, the voltage for aging was adjusted to 3.5 V because decomposition of not only LDFOB but also the solvent proceeds at 4.1 V. In addition, since a requirement of 168 hours is not realistic considering actual manufacturing, it was set to 48 hours here.)

As described above, although the aging at 60° C. accelerates the decomposition of LDFOB to express an effect of reducing the generation of gas during a durability test (cycle test), the gas generation amount during the durability test (cycle test) is still large compared to the cases of lithium cobaltate positive electrode and lithium manganate positive electrode, and the results are unsatisfactory. In addition, since the initial charge/discharge and the aging take almost 60 hours in total, considering the battery production efficiency, it is a method that needs improvement.

EXAMPLES

The present invention will now be described in further detail by way of examples, but is not limited to the description of the examples.

[Production of LCO Positive Electrode]

LiCoO$_2$ powder (92.0 mass %) was mixed with polyvinylidene fluoride (hereinafter, PVDF) (4.0 mass %) as a binder and acetylene black (4.0 mass %) as a conductive material, and N-methyl-2-pyrrolidone (hereinafter, NMP) was further added to the mixture to produce a positive electrode mixture paste. This paste was applied to both surfaces of an aluminum foil (A1085), followed by drying, pressing, and then punching to 8 cm×10 cm to form an LCO positive electrode (double-sides coated positive electrode) for testing. In addition, an LCO positive electrode (single-side coated positive electrode) for testing was similarly prepared by applying the positive electrode mixture to one surface of the aluminum foil (A1085).

[Production of NCM111 Positive Electrode]

LiNi$_{1/3}$Mn$_{1/3}$Co$_{1/3}$O$_2$ powder (92.0 mass %) was mixed with PVDF (4.0 mass %) as a binder and acetylene black (4.0 mass %) as a conductive material, and NMP was further added to the mixture to produce a positive electrode mixture paste. This paste was applied to both surfaces of an aluminum foil (A1085), followed by drying, pressing, and then punching to 8 cm×10 cm to form an NCM111 positive electrode (double-sides coated positive electrode) for testing. In addition, an NCM111 positive electrode (single-side coated positive electrode) for testing was similarly prepared by applying the positive electrode mixture to one surface of the aluminum foil (A1085).

[Production of NCM811 Positive Electrode]

LiNi$_{0.8}$Mn$_{0.1}$Co$_{0.1}$O$_2$ powder (91.0 mass %) was mixed with PVDF (4.5 mass %) as a binder and acetylene black (4.5 mass %) as a conductive material, and NMP was further added to the mixture to produce a positive electrode mixture paste. This paste was applied to both surfaces of an aluminum foil (A1085), followed by drying, pressing, and then punching to 8 cm×10 cm to form an NCM811 positive electrode (double-sides coated positive electrode) for testing. In addition, an NCM811 positive electrode (single-side coated positive electrode) for testing was similarly prepared by applying the positive electrode mixture to one surface of the aluminum foil (A1085).

[Production of NCA Positive Electrode]

LiNi$_{0.87}$Co$_{0.10}$Al$_{0.03}$O$_2$ powder (89.0 mass %) was mixed with PVDF (5.0 mass %) as a binder and acetylene black (6.0 mass %) as a conductive material, and NMP was further added to the mixture to produce a positive electrode mixture paste. This paste was applied to both surfaces of an aluminum foil (A1085), followed by drying, pressing, and then punching to 8 cm×10 cm to form an NCA positive electrode (double-sides coated positive electrode) for testing. In addition, an NCA positive electrode (single-side coated positive electrode) for testing was similarly prepared by applying the positive electrode mixture to one surface of the aluminum foil (A1085).

[Production of Artificial Graphite Negative Electrode]

Artificial graphite powder (92.0 mass %) was mixed with PVDF (8.0 mass %) as a binder, and NMP was further added to the mixture to produce a negative electrode mixture paste. This paste was applied to both surfaces of a copper foil, followed by drying, pressing, and then punching to 8 cm×10 cm to form an artificial graphite negative electrode for testing.

[Production of Natural Graphite Negative Electrode]

Natural graphite powder (90.0 mass %) was mixed with PVDF (10.0 mass %) as a binder, and NMP was further added to the mixture to produce a negative electrode mixture paste. This paste was applied to both surfaces of a copper foil, followed by drying, pressing, and then punching to 8 cm×10 cm to form a natural graphite negative electrode for testing.

[Production of Silicon-Containing Graphite Negative Electrode]

Artificial graphite powder (85.0 mass %) was mixed with nano silicon (7.0 mass %), a conductive material (HS-100) (3.0 mass %), carbon nanotube (VGCF) (2.0 mass %), styrene butadiene rubber (2.0 mass %), sodium carboxymethyl cellulose (1.0 mass %), and water to produce a negative electrode mixture paste. This paste was applied to both surfaces of a copper foil, followed by drying, pressing, and then punching to 8 cm×10 cm to form a silicon-containing graphite negative electrode for testing.

[Preparation of Reference Electrolyte]

Reference electrolytes containing solutes, solvents, and hydrogen fluoride shown in Table 1 were prepared. The method for measuring the content of hydrogen fluoride in the reference electrolytes will now be shown. First, the free acid concentration in the reference electrolyte is determined by neutralization titration. Then, 1,3-ditrifluoroethoxy-1,1,3,3-tetramethyldisiloxane (hereinafter, simply referred to as "disiloxane") in an amount of about 50 times the resulting free acid concentration (e.g., 500 mass ppm when the free acid concentration is 10 mass ppm) is added to the reference electrolyte, followed by stirring at room temperature for 2 hours. Subsequently, the free acid concentration in the resulting reference electrolyte is determined again by neutralization titration. Since this disiloxane is known to rapidly and selectively react with hydrogen fluoride, the value obtained by subtracting the free acid concentration after the addition of disiloxane from the free acid concentration before the addition is the concentration of hydrogen fluoride in the reference electrolyte.

Incidentally, the details of the neutralization titration are as follows. Acetone (100 mL) (manufactured by Wako Pure Chemical Corporation, super-dehydrated product) and bromophenol blue-ethanol solution (several drops) (manufactured by Wako Pure Chemical Corporation) are put in a 300-mL fluororesin beaker that has been dried at 200° C. for 12 hours or more and then cooled to near room temperature in a dried nitrogen atmosphere having a dew point of −70° C. or less. An electrolyte (50.0 g) is added to the beaker, and neutralization titration with a 0.005 N triethylamine-acetone solution is performed while stirring (the acetone is a super-dehydrated product manufactured by Wako Pure Chemical Corporation, and the triethylamine is prepared by dehydrating a special grade product manufactured by Wako Pure Chemical Corporation to a water content of 100 mass ppm or less). The end point is the point where the color of the solution has changed from yellow to purple. The free acid concentration in a sample can be determined by the following equation, where A indicates the volume of the used triethylamine-acetone solution.

$$\text{Free acid concentration} = A \times 0.005 \times 20 \times 1000/50.0$$

TABLE 1

| Reference electrolyte | Solute | | Solvent (volume ratio) | | | | | Content of HF [mass ppm] |
|---|---|---|---|---|---|---|---|---|
| | LiPF$_6$ | LiFSI | DMC | EMC | DEC | EC | FEC | |
| A-0 | 1.0M | — | 3 | 4 | — | 3 | — | 3.00 |
| A-1 | | | | | | | | 9.00 |
| A-2 | | | | | | | | 18.00 |
| A-3 | | | | | | | | 95.00 |
| A-4 | | | | | | | | 193.00 |
| B-0 | 0.7M | 0.3M | — | 7 | — | 1 | 2 | 3.00 |
| B-1 | | | | | | | | 15.00 |
| C-0 | 1.0M | — | 7 | — | — | 3 | — | 3.00 |
| C-1 | | | | | | | | 17.00 |
| D-0 | 1.0M | — | — | — | 7 | 2 | 1 | 3.00 |
| D-1 | | | | | | | | 17.00 |
| E-0 | 1.0M | — | — | 2 | — | 1 | — | 3.00 |
| E-1 | | | | | | | | 18.00 |

[Preparation of Non-Aqueous Electrolytes 1 to 54]

Monochelate complex (1a) was added to reference electrolyte A-0 so as to give a concentration of 0.3 mass %, followed by stirring for 1 hour to prepare non-aqueous electrolyte 1. In the monochelate complex (1a) used here, the cation was lithium, and the free acid concentration therein was 30 mass ppm or less. Examples of the free acid other than hydrogen fluoride include oxalic acid and monolithium oxalate when the ligand is oxalic acid; malonic acid and monolithium malonate when the ligand is malonic acid; and 2-hydroxy-3-trifluoro-3'-trifluoroisobutyric acid when the ligand is 2-hydroxy-3-trifluoro-3'-trifluoroisobutyric acid. In addition, a monochelate complex whose cation is a proton can become a free acid source. Assuming that the free acids are all hydrogen fluoride, the maximum amount is 30 mass ppm. For example, when 3 mass % of monochelate complex (1a) is added, the hydrogen fluoride concentration derived from the monochelate complex (1a) in the electrolyte is 0.9 mass ppm or less. The same applies to when monochelate complex (1a) is used.

Each monochelate complex (cation is lithium, and the free acid amount contained in a monochelate complex other than monochelate complex (1a) is 20 mass ppm or less, and the same applies to when a monochelate complex other than (1a) is used) was added to each reference electrolyte so as to give the concentrations shown in Tables 2 and 3, followed by stirring for 1 hour to prepare non-aqueous electrolytes 2 to 54.

TABLE 2

| | Monochelate complex (M = Li) | | | Reference electrolyte | |
|---|---|---|---|---|---|
| Non-aqueous electrolyte | Compound No. | Concentration [mass %] | Content of HF [mass ppm] | No. | HF concentration [mass ppm] |
| 1 | 1a | 0.3 | ≤0.09 | A-0 | 3.00 |
| 2 | | | | A-1 | 9.00 |
| 3 | | | | A-2 | 18.00 |
| 4 | | | | A-3 | 95.00 |
| 5 | | | | A-4 | 193.00 |
| 6 | 1a | 1.5 | ≤0.45 | A-0 | 3.00 |
| 7 | | | | A-1 | 9.00 |
| 8 | | | | A-2 | 18.00 |
| 9 | | | | A-3 | 95.00 |
| 10 | | | | A-4 | 193.00 |
| 11 | 1a | 3.0 | ≤0.90 | A-0 | 3.00 |
| 12 | | | | A-1 | 9.00 |
| 13 | | | | A-2 | 18.00 |
| 14 | | | | A-3 | 95.00 |
| 15 | | | | A-4 | 193.00 |

TABLE 3

| | Monochelate complex (M = Li) | | | Reference electrolyte | |
|---|---|---|---|---|---|
| Non-aqueous electrolyte | Compound No. | Concentration [mass %] | Content of HF [mass ppm] | Compound No. | Concentration [mass %] |
| 16 | 1d | 1.5 | ≤0.30 | A-0 | 3.00 |
| 17 | | | | A-1 | 9.00 |
| 18 | | | | A-4 | 193.00 |
| 19 | 1g | 1.5 | ≤0.30 | A-0 | 3.00 |
| 20 | | | | A-1 | 9.00 |
| 21 | | | | A-4 | 193.00 |
| 22 | 1h | 1.0 | ≤0.20 | A-0 | 3.00 |
| 23 | | | | A-1 | 9.00 |
| 24 | | | | A-4 | 193.00 |
| 25 | 1i | 0.3 | ≤0.06 | A-0 | 3.00 |
| 26 | | | | A-1 | 9.00 |
| 27 | | | | A-2 | 18.00 |
| 28 | | | | A-3 | 95.00 |
| 29 | | | | A-4 | 193.00 |
| 30 | 1i | 1.5 | ≤0.30 | A-0 | 3.00 |
| 31 | | | | A-1 | 9.00 |
| 32 | | | | A-2 | 18.00 |
| 33 | | | | A-3 | 95.00 |
| 34 | | | | A-4 | 193.00 |
| 35 | 1i | 3.0 | ≤0.60 | A-0 | 3.00 |
| 36 | | | | A-1 | 9.00 |
| 37 | | | | A-2 | 18.00 |

TABLE 3-continued

| Non-aqueous electrolyte | Monochelate complex (M = Li) | | | Reference electrolyte | |
|---|---|---|---|---|---|
| | Compound No. | Concentration [mass %] | Content of HF [mass ppm] | Compound No. | Concentration [mass %] |
| 38 | | | | A-3 | 95.00 |
| 39 | | | | A-4 | 193.00 |
| 40 | 1p | 1.5 | ≤0.30 | A-0 | 3.00 |
| 41 | | | | A-1 | 9.00 |
| 42 | | | | A-4 | 193.00 |
| 43 | 2a | 1.5 | ≤0.30 | A-0 | 3.00 |
| 44 | | | | A-1 | 9.00 |
| 45 | | | | A-4 | 193.00 |
| 46 | 2g | 1.5 | ≤0.30 | A-0 | 3.00 |
| 47 | | | | A-1 | 9.00 |
| 48 | | | | A-4 | 193.00 |
| 49 | 2i | 1.5 | ≤0.30 | A-0 | 3.00 |
| 50 | | | | A-1 | 9.00 |
| 51 | | | | A-4 | 193.00 |
| 52 | 2o | 1.5 | ≤0.30 | A-0 | 3.00 |
| 53 | | | | A-1 | 9.00 |
| 54 | | | | A-4 | 193.00 |

[Preparation of Non-Aqueous Electrolytes 55 to 102]

Monochelate complex (1a) was added to reference electrolyte B-0 so as to give a concentration of 1.5 mass %, followed by stirring for 1 hour to prepare non-aqueous electrolyte 55. Subsequently, monochelate complex (1a) was added to reference electrolyte B-1 so as to give a concentration of 1.5 mass %, followed by stirring for 1 hour to prepare non-aqueous electrolyte 56. Furthermore, lithium difluorophosphate (hereinafter, $LiPO_2F_2$) as an additional component was added to the non-aqueous electrolyte 56 so as to give a concentration of 0.5 mass %, followed by stirring for 1 hour to prepare non-aqueous electrolyte 57.

Each monochelate complex was added to each reference electrolyte so as to give the concentrations shown in Tables 4 and 5, followed by stirring for 1 hour. In addition, LiFSI, $LiPO_2F_2$, or lithium fluorosulfonate (hereinafter, $LiSO_3F$) was added as an additional component to each of the resulting non-aqueous electrolytes so as to give the concentrations shown in Tables 4 and 5, followed by stirring for 1 hour to prepare non-aqueous electrolytes 58 to 102.

[Preparation of Non-Aqueous Electrolytes 103 to 106]

$LiPO_2F_2$ was added to reference electrolyte B-0 so as to give a concentration of 0.5 mass %, followed by stirring for 1 hour to prepare non-aqueous electrolyte 103. LiFSI was added to reference electrolyte C-0 so as to give a concentration of 0.5 mass %, followed by stirring for 1 hour to prepare non-aqueous electrolyte 104.

$LiPO_2F_2$ was added to reference electrolyte D-0 so as to give a concentration of 0.5 mass %, followed by stirring for 1 hour to prepare non-aqueous electrolyte 105. $LiSO_3F$ was added to reference electrolyte E-0 so as to give a concentration of 0.5 mass %, followed by stirring for 1 hour to prepare non-aqueous electrolyte 106.

TABLE 4

| Non-aqueous electrolyte | Monochelate complex (M = Li) | | | Reference electrolyte | | Additional component | |
|---|---|---|---|---|---|---|---|
| | Compound No. | Concentration [mass %] | Content of HF [mass ppm] | No. | HF concentration [mass ppm] | Type | Concentration [mass %] |
| 55 | 1a | 1.5 | ≤0.45 | B-0 | 3.00 | $LiPO_2F_2$ | — |
| 56 | | | | B-1 | 15.00 | | — |
| 57 | | | | B-1 | 15.00 | | 0.5 |
| 58 | 1d | 1.5 | ≤0.30 | B-0 | 3.00 | | — |
| 59 | | | | B-1 | 15.00 | | — |
| 60 | | | | B-1 | 15.00 | | 0.5 |
| 61 | 1h | 1.0 | ≤0.20 | B-0 | 3.00 | | — |
| 62 | | | | B-1 | 15.00 | | — |
| 63 | | | | B-1 | 15.00 | | 0.5 |
| 64 | 1i | 1.5 | ≤0.30 | B-0 | 3.00 | | — |
| 65 | | | | B-1 | 15.00 | | — |
| 66 | | | | B-1 | 15.00 | | 0.5 |
| 67 | 1a | 1.5 | ≤0.45 | C-0 | 3.00 | LiFSI | — |
| 68 | | | | C-1 | 17.00 | | — |
| 69 | | | | C-1 | 17.00 | | 0.5 |
| 70 | 1g | 1.5 | ≤0.30 | C-0 | 3.00 | | — |
| 71 | | | | C-1 | 17.00 | | — |
| 72 | | | | C-1 | 17.00 | | 0.5 |
| 73 | 1i | 1.5 | ≤0.30 | C-0 | 3.00 | | — |
| 74 | | | | C-1 | 17.00 | | — |
| 75 | | | | C-1 | 17.00 | | 0.5 |
| 76 | 1p | 1.5 | ≤0.30 | C-0 | 3.00 | | — |
| 77 | | | | C-1 | 17.00 | | — |
| 78 | | | | C-1 | 17.00 | | 0.5 |

TABLE 5

| Non-aqueous electrolyte | Monochelate complex (M = Li) | | | Reference electrolyte | | Additional component | |
|---|---|---|---|---|---|---|---|
| | Compound No. | Concentration [mass %] | Content of HF [mass ppm] | No. | HF concentration [mass ppm] | Type | Concentration [mass %] |
| 79 | 1a | 1.5 | ≤0.45 | D-0 | 3.00 | LiPO$_2$F$_2$ | — |
| 80 | | | | D-1 | 17.00 | | — |
| 81 | | | | D-1 | 17.00 | | 0.5 |
| 82 | 1i | 1.5 | ≤0.30 | D-0 | 3.00 | | — |
| 83 | | | | D-1 | 17.00 | | — |
| 84 | | | | D-1 | 17.00 | | 0.5 |
| 85 | 1p | 1.0 | ≤0.30 | D-0 | 3.00 | | — |
| 86 | | | | D-1 | 17.00 | | — |
| 87 | | | | D-1 | 17.00 | | 0.5 |
| 88 | 2g | 1.5 | ≤0.30 | D-0 | 3.00 | | — |
| 89 | | | | D-1 | 17.00 | | — |
| 90 | | | | D-1 | 17.00 | | 0.5 |
| 91 | 1a | 1.5 | ≤0.45 | E-0 | 3.00 | LiSO$_3$F | — |
| 92 | | | | E-1 | 18.00 | | — |
| 93 | | | | E-1 | 18.00 | | 0.5 |
| 94 | 1i | 1.5 | ≤0.30 | E-0 | 3.00 | | — |
| 95 | | | | E-1 | 18.00 | | — |
| 96 | | | | E-1 | 18.00 | | 0.5 |
| 97 | 1d | 1.5 | ≤0.30 | E-0 | 3.00 | | — |
| 98 | | | | E-1 | 18.00 | | — |
| 99 | | | | E-1 | 18.00 | | 0.5 |
| 100 | 2i | 1.5 | ≤0.30 | E-0 | 3.00 | | — |
| 101 | | | | E-1 | 18.00 | | — |
| 102 | | | | E-1 | 18.00 | | 0.5 |
| 103 | None | — | — | B-0 | 3.00 | LiPO$_2$F$_2$ | 0.5 |
| 104 | None | — | — | C-0 | 3.00 | LiFSI | 0.5 |
| 105 | None | — | — | D-0 | 3.00 | LiPO$_2$F$_2$ | 0.5 |
| 106 | None | — | — | E-0 | 3.00 | LiSO$_3$F | 0.5 |

[Preparation of Non-Aqueous Electrolyte Battery A] NCM811/Artificial Graphite

Terminals were welded to the above-described NCM811 positive electrodes (three double-sides coated positive electrodes and two single-side coated positive electrodes) and artificial graphite negative electrodes (four double-sides coated negative electrodes) in an argon atmosphere having a dew point of −60° C. or less. Subsequently, the positive electrodes (three double-sides coated positive electrodes and two single-side coated positive electrodes) and the negative electrodes (four double-sides coated negative electrodes) were alternately stacked with a polyethylene separator (9 cm×11 cm) therebetween such that the outermost surfaces were the surfaces of the single-side coated positive electrodes to which the active material was not applied. The stacked product was put in an aluminum laminated bag having an opening on one side, non-aqueous electrolyte 1 was vacuum-injected into the bag, and the opening was then sealed with heat to produce an aluminum-laminated battery. In addition, cells were similarly produced using non-aqueous electrolytes 2 to 54 respectively. The capacity of the battery normalized by the mass of the positive electrode active material was 880 mAh.

[Production of Non-Aqueous Electrolyte Battery B] NCM811/Silicon-Containing Graphite Aluminum-laminated batteries using NCM811 as the positive electrode and silicon-containing graphite as the negative electrode were produced by the same procedure as in non-aqueous electrolyte battery A except that silicon-containing graphite was used as the negative electrode. The electrolytes used were electrolytes 55 to 66 and 103 respectively. The capacity of the batteries normalized by the mass of the positive electrode active material was 880 mAh.

(Production of Non-Aqueous Electrolyte Battery C) NCA/Artificial Graphite

Aluminum-laminated batteries using NCA as the positive electrode and artificial graphite as the negative electrode were produced by the same procedure as in non-aqueous electrolyte battery A except that NCA was used as the positive electrode. The electrolytes used were electrolytes 67 to 78 and 104 respectively. The capacity of the batteries normalized by the mass of the positive electrode active material was 860 mAh.

[Production of Non-Aqueous Electrolyte Battery D] NCA/Silicon-Containing Graphite Aluminum-laminated batteries using NCA as the positive electrode and silicon-containing graphite as the negative electrode were produced by the same procedure as in non-aqueous electrolyte battery A except that NCA was used as the positive electrode and silicon-containing graphite was used as the negative electrode. The electrolytes used were electrolytes 79 to 90 and 105 respectively. The capacity of the batteries normalized by the mass of the positive electrode active material was 860 mAh.

[Production of Non-Aqueous Electrolyte Battery E] NCM111/Natural Graphite

Aluminum-laminated batteries using NCM111 as the positive electrode and natural graphite as the negative electrode were produced by the same procedure as in non-aqueous electrolyte battery A except that NCM111 was used as the positive electrode and natural graphite was used as the negative electrode. The electrolytes used were electrolytes 91 to 102 and 106 respectively. The capacity of the batteries specified by the mass of the positive electrode active material was 700 mAh.

[Production of Non-Aqueous Electrolyte Battery F] LCO/Artificial Graphite

Aluminum-laminated batteries using LCO as the positive electrode and artificial graphite as the negative electrode were produced by the same procedure as in non-aqueous electrolyte battery A except that LCO was used as the positive electrode. The electrolytes used were electrolytes 6, 22, 30, and 46 respectively. The capacity of the batteries specified by the mass of the positive electrode active material was 670 mAh.

[Initial Charge/Discharge and Aging]

Each of the assembled batteries was connected to a charge/discharge device and was placed in a thermostat of 60° C. The voltage was increased up to 3.5 V at a charging rate of 0.2 C (the current value reaching the full charge in 5 hours), and the batteries were then left to stand for 24 hours for aging. Subsequently, the voltage was increased up to the upper limit voltage (4.3 V in battery E, 4.2 V in batteries A, B, and F, and 4.1 V in batteries C and D) at 0.2 C, and the upper limit voltage was maintained for 1 hour. Subsequently, discharge was performed down to the lower limit voltage (2.7 V in batteries C and D, and 3.0 V in other batteries) at a discharging rate of 0.2 C.

[Preliminary Charge/Discharge]

The cells after initial charge/discharge and aging were taken out from the thermostat of 60° C. and were charged up to the upper limit voltage at a charging rate of 0.5 C in an environment of 25° C., the upper limit voltage was maintained for 1 hour, and discharge was performed down to the lower limit voltage at a discharging rate of 0.5 C. This charge/discharge at 25° C. was performed five times in total to stabilize the batteries.

[Cell Volume Measurement Before Cycle]

The volumes of the cells after preliminary charge/discharge were measured by the Archimedes method.

[Cycle Test]

Each of the cells after preliminary charge/discharge was connected to a charge/discharge device, put in a thermostat of 50° C., and left to stand therein for 2 hours, followed by charging up to the upper limit voltage at a charging rate of 1 C. After reaching the upper limit voltage, the voltage was maintained for 1 hour, followed by discharging down to the lower limit voltage at a discharging rate of 1 C. This charge/discharge at 1 C in an environment of 50° C. was repeated 700 cycles for batteries A, C, E, and F and 200 cycles for batteries B and D. The capacity retention after the cycle was calculated by the following equation:

Capacity retention [%]=(discharge capacity at the time of final cycle/discharge capacity at the first cycle)×100.

[Cell Volume Measurement after Cycle]

The cells after the cycle test were taken out from the thermostat of 50° C. and were each detached from the charge/discharge device. After leaving to stand in an environment of 25° C. for 2 hours, the volumes of the cells were measured by the Archimedes method. The gas generation amount in the cycle test was calculated by the following equation:

Gas generation amount [mL]=cell volume after the final cycle−cell volume after preliminary charge/discharge

[Evaluation of Non-Aqueous Electrolyte Battery A]

The results of examples and comparative examples of non-aqueous electrolyte battery A having a configuration using NCM811 as the positive electrode and artificial graphite as the negative electrode will now be described. Incidentally, the results of non-aqueous electrolyte battery F configured using LCO as the positive electrode and artificial graphite as the negative electrode are shown as the results of a reference example.

The measurement results of a battery using electrolyte 1 were defined as the results of Comparative Example 1-1, and the measurement results of batteries using electrolytes 2 to 5 were defined as the results of Examples 1-1 to 1-4, respectively. Table 6 shows the relative values of Examples 1-1 to 1-4 when the value of Comparative Example 1-1 was defined as 100.

The measurement results of a battery using electrolyte 6 were defined as the results of Comparative Example 1-2, and the measurement results of batteries using electrolytes 7 to 10 were defined as the results of Examples 1-5 to 1-8, respectively. In addition, the measurement results of a battery using an LCO positive electrode and electrolyte 6 were defined as the results of Reference Example 1-1. Table 6 shows the relative values of Reference Example 1-1 and Examples 1-5 to 1-8 when the value of Comparative Example 1-2 was defined as 100.

The measurement results of a battery using electrolyte 11 were defined as the results of Comparative Example 1-3, and the measurement results of batteries using electrolytes 12 to 15 were defined as the results of Examples 1-9 to 1-12, respectively. Table 6 shows the relative values of Examples 1-9 to 1-12 when the value of Comparative Example 1-3 was defined as 100.

The measurement results of a battery using electrolyte 16 were defined as the results of Comparative Example 1-4, and the measurement results of batteries using electrolytes 17 and 18 were defined as the results of Examples 1-13 and 1-14, respectively. Table 7 shows the relative values of Examples 1-13 and 1-14 when the value of Comparative Example 1-4 was defined as 100.

The measurement results of a battery using electrolyte 19 were defined as the results of Comparative Example 1-5, and the measurement results of batteries using electrolytes 20 and 21 were defined as the results of Examples 1-15 and 1-16, respectively. Table 7 shows the relative values of Examples 1-15 and 1-16 when the value of Comparative Example 1-5 was defined as 100.

The measurement results of a battery using electrolyte 22 were defined as the results of Comparative Example 1-6, and the measurement results of batteries using electrolytes 23 and 24 were defined as the results of Examples 1-17 and 1-18, respectively. In addition, the measurement results of a battery using an LCO positive electrode and electrolyte 22 were defined as the results of Reference Example 1-2. Table 7 shows the relative values of Reference Example 1-2 and Examples 1-17 and 1-18 when the value of Comparative Example 1-6 was defined as 100.

The measurement results of a battery using electrolyte 25 were defined as the results of Comparative Example 1-7, and the measurement results of batteries using electrolytes 26 to 29 were defined as the results of Examples 1-19 to 1-22, respectively. Table 7 shows the relative values of Examples 1-19 to 1-22 when the value of Comparative Example 1-7 was defined as 100.

The measurement results of a battery using electrolyte 30 were defined as the results of Comparative Example 1-8, and the measurement results of batteries using electrolytes 31 to 34 were defined as the results of Examples 1-23 to 1-26, respectively. In addition, the measurement results of a battery using an LCO positive electrode and electrolyte 30 were defined as the results of Reference Example 1-3. Table 7 shows the relative values of Reference Example 1-3 and Examples 1-23 to 1-26 when the value of Comparative Example 1-8 was defined as 100.

The measurement results of a battery using electrolyte 35 were defined as the results of Comparative Example 1-9, and the measurement results of batteries using electrolytes 36 to 39 were defined as the results of Examples 1-27 to 1-30, respectively. Table 7 shows the relative values of Examples 1-27 to 1-30 when the value of Comparative Example 1-9 was defined as 100.

The measurement results of a battery using electrolyte 40 were defined as the results of Comparative Example 1-10, and the measurement results of batteries using electrolytes 41 and 42 were defined as the results of Examples 1-31 and 1-32, respectively. Table 7 shows the relative values of Examples 1-31 and 1-32 when the value of Comparative Example 1-10 was defined as 100.

The measurement results of a battery using electrolyte 43 were defined as the results of Comparative Example 1-11, and the measurement results of batteries using electrolytes 44 and 45 were defined as the results of Examples 1-33 and 1-34, respectively. Table 8 shows the relative values of Examples 1-33 and 1-34 when the value of Comparative Example 1-11 was defined as 100.

The measurement results of a battery using electrolyte 46 were defined as the results of Comparative Example 1-12, and the measurement results of batteries using electrolytes 47 and 48 were defined as the results of Examples 1-35 and 1-36, respectively. In addition, the measurement results of a battery using an LCO positive electrode and electrolyte 46 were defined as the results of Reference Example 1-4.

Table 8 shows the relative values of Reference Example 1-4 and Examples 1-35 and 1-36 when the value of Comparative Example 1-12 was defined as 100.

The measurement results of a battery using electrolyte 49 were defined as the results of Comparative Example 1-13, and the measurement results of batteries using electrolytes 50 and 51 were defined as the results of Examples 1-37 and 1-38, respectively. Table 8 shows the relative values of Examples 1-37 and 1-38 when the value of Comparative Example 1-13 was defined as 100.

The measurement results of a battery using electrolyte 52 were defined as the results of Comparative Example 1-14, and the measurement results of batteries using electrolytes 53 and 54 were defined as the results of Examples 1-39 and 1-40, respectively. Table 8 shows the relative values of Examples 1-39 and 1-40 when the value of Comparative Example 1-14 was defined as 100.

TABLE 6

Non-aqueous electrolyte battery A (Reference Example 1-1: Non-aqueous electrolyte battery F)

| | Non-aqueous electrolyte No | Complex type/ addition amount [mass %] | HF concentration in (I) to (III) [mass ppm] | Positive electrode | Negative electrode | Gas amount after cycle | Capacity retention |
|---|---|---|---|---|---|---|---|
| Comparative Example 1-1 | 1 | 1a/0.3 | 3.00~≤3.09 | NCM811 | artificial graphite | 100.0 | 100.0 |
| Example 1-1 | 2 | | 9.00~≤9.09 | | | 98.2 | 100.3 |
| Example 1-2 | 3 | | 18.00~≤18.09 | | | 89.0 | 100.3 |
| Example 1-3 | 4 | | 95.00~≤95.09 | | | 78.6 | 101.1 |
| Example 1-4 | 5 | | 193.00~≤193.09 | | | 73.7 | 100.1 |
| Reference Example 1-1 | 6 | 1a/1.5 | 3.00~≤3.45 | LCO | | 62.7 | — |
| Comparative Example 1-2 | 6 | | 3.00~≤3.45 | NCM811 | | 100.0 | 100.0 |
| Example 1-5 | 7 | | 9.00~≤9.45 | | | 98.0 | 100.0 |
| Example 1-6 | 8 | | 18.00~≤18.45 | | | 88.4 | 100.1 |
| Example 1-7 | 9 | | 95.00~≤95.45 | | | 77.6 | 101.4 |
| Example 1-8 | 10 | | 193.00~≤193.45 | | | 73.5 | 100.4 |
| Comparative Example 1-3 | 11 | 1a/3.0 | 3.00~≤3.90 | NCM811 | | 100.0 | 100.0 |
| Example 1-9 | 12 | | 9.00~≤9.90 | | | 98.5 | 100.0 |
| Example 1-10 | 13 | | 18.00~≤18.90 | | | 88.3 | 100.7 |
| Example 1-11 | 14 | | 95.00~≤95.90 | | | 74.7 | 101.6 |
| Example 1-12 | 15 | | 193.00~≤193.90 | | | 71.7 | 100.3 |

TABLE 7

Non-aqueous electrolyte battery A (Reference Example 1-2 and 1-3: Non-aqueous electrolyte battery F)

| | Non-aqueous electrolyte No | Complex type/ addition amount [mass %] | HF concentration in (I) to (III) [mass ppm] | Positive electrode | Negative electrode | Gas amount after cycle | Capacity retention |
|---|---|---|---|---|---|---|---|
| Comparative Example 1-4 | 16 | 1d/1.5 | 3.00~≤3.30 | NCM811 | artificial graphite | 100.0 | — |
| Example 1-13 | 17 | | 9.00~≤9.30 | | | 95.5 | — |
| Example 1-14 | 18 | | 193.00~≤193.30 | | | 75.8 | — |
| Comparative Example 1-5 | 19 | 1g/1.5 | 3.00~≤3.30 | NCM811 | | 100.0 | — |
| Example 1-15 | 20 | | 9.00~≤9.30 | | | 97.7 | — |
| Example 1-16 | 21 | | 193.00~≤193.30 | | | 83.7 | — |
| Reference Example 1-2 | 22 | 1h/1.0 | 3.00~≤3.20 | LCO | | 61.4 | — |
| Comparative Example 1-6 | 22 | | 3.00~≤3.20 | NCN811 | | 100.0 | — |
| Example 1-17 | 23 | | 9.00~≤9.20 | | | 95.5 | — |

TABLE 7-continued

Non-aqueous electrolyte battery A (Reference Example 1-2 and 1-3: Non-aqueous electrolyte battery F)

|  | Non-aqueous electrolyte No | Complex type/ addition amount [mass %] | HF concentration in (I) to (III) [mass ppm] | Positive electrode | Negative electrode | Gas amount after cycle | Capacity retention |
|---|---|---|---|---|---|---|---|
| Example 1-18 | 24 |  | 193.00~≤193.20 |  |  | 79.5 | — |
| Comparative Example 1-7 | 25 | 1i/0.3 | 3.00~≤3.06 | NCM811 |  | 100.0 | 100.0 |
| Example 1-19 | 26 |  | 9.00~≤9.06 |  |  | 98.1 | 100.0 |
| Example 1-20 | 27 |  | 18.00~≤18.06 |  |  | 92.3 | 100.3 |
| Example 1-21 | 28 |  | 95.00~≤95.06 |  |  | 83.1 | 101.8 |
| Example 1-22 | 29 |  | 193.00~≤193.06 |  |  | 79.8 | 99.6 |
| Reference Example 1-3 | 30 | 1i/1.5 | 3.00~≤3.30 | LCO |  | 71.9 | — |
| Comparative Example 1-8 | 30 |  | 3.00~≤3.30 | NCM811 |  | 100.0 | 100.0 |
| Example 1-23 | 31 |  | 9.00~≤9.30 |  |  | 98.5 | 100.0 |
| Example 1-24 | 32 |  | 18.00~≤18.30 |  |  | 91.3 | 100.5 |
| Example 1-25 | 33 |  | 95.00~≤95.30 |  |  | 83.3 | 101.6 |
| Example 1-26 | 34 |  | 193.00~≤193.30 |  |  | 76.5 | 101.2 |
| Comparative Example 1-9 | 35 | 1i/3.0 | 3.00~≤3.60 | NCM811 |  | 100.0 | 100.0 |
| Example 1-27 | 36 |  | 9.00~≤9.60 |  |  | 98.6 | 100.1 |
| Example 1-28 | 37 |  | 18.00~≤18.60 |  |  | 93.8 | 100.2 |
| Example 1-29 | 38 |  | 95.00~≤95.60 |  |  | 84.6 | 101.0 |
| Example 1-30 | 39 |  | 193.00~≤193.60 |  |  | 80.9 | 100.3 |
| Comparative Example 1-10 | 40 | 1p/1.5 | 3.00~≤3.30 | NCM811 |  | 100.0 | — |
| Example 1-31 | 41 |  | 9.00~≤9.30 |  |  | 98.1 | — |
| Example 1-32 | 42 |  | 193.00~≤193.30 |  |  | 83.7 | — |

TABLE 8

Non-aqueous electrolyte battery A (Reference Example 1-4: Non-aqueous electrolyte battery F)

|  | Non-aqueous electrolyte No | Complex type/ addition amount [mass %] | HF concentration in (I) to (III) [mass ppm] | Positive electrode | Negative electrode | Gas amount after cycle | Capacity retention |
|---|---|---|---|---|---|---|---|
| Comparative Example 1-11 | 43 | 2a/1.5 | 3.00~≤3.30 | NCM811 | artificial graphite | 100.0 | — |
| Example 1-33 | 44 |  | 9.00~≤9.30 |  |  | 99.1 | — |
| Example 1-34 | 45 |  | 193.00~≤193.30 |  |  | 86.2 | — |
| Reference Example 1-4 | 46 | 2g/1.5 | 3.00~≤3.30 | LCO |  | 65.3 | — |
| Comparative Example 1-12 | 46 |  | 3.00~≤3.30 | NCM811 |  | 100.0 | — |
| Example 1-35 | 47 |  | 9.00~≤9.30 |  |  | 99.3 | — |
| Example 1-36 | 48 |  | 193.00~≤193.30 |  |  | 88.5 | — |
| Comparative Example 1-13 | 49 | 2i/1.5 | 3.00~≤3.30 | NCM811 |  | 100.0 | — |
| Example 1-37 | 50 |  | 9.00~≤9.30 |  |  | 98.8 | — |
| Example 1-38 | 51 |  | 193.00~≤193.30 |  |  | 90.2 | — |
| Comparative Example 1-14 | 52 | 2o/1.5 | 3.00~≤3.30 | NCM811 |  | 100.0 | — |
| Example 1-39 | 53 |  | 9.00~≤9.30 |  |  | 98.9 | — |
| Example 1-40 | 54 |  | 193.00~≤193.30 |  |  | 93.2 | — |

It was observed that in all cases in which the addition amounts of the monochelate complex (1a) were 0.3 mass % (Comparative Example 1-1 and Examples 1-1 to 1-4), 1.5 mass % (Comparative Example 1-2 and Examples 1-5 to 1-8), and 3.0 mass % (Comparative Example 1-3 and Examples 1-9 to 1-12), the gas amounts after the cycle test were reduced by using the electrolytes according to the Examples in which the hydrogen fluoride concentration was "5 mass ppm or more and less than 200 mass ppm", compared to the cases of using the electrolytes according to the Comparative Examples in which the hydrogen fluoride concentration was less than 5 mass ppm. It was also observed that the effect of reducing the gas amount was enhanced with an increase in the hydrogen fluoride concentration. In addition, regarding the capacity retention (cycle characteristics) after cycle, although no improvement or little improvement in the effect was observed in the Examples in which the hydrogen fluoride concentration was about 9 mass ppm or about 18 mass ppm (Examples 1-1 and 1-2, 1-5 and 1-6, and 1-9 and 1-10), an obvious improvement was observed when the hydrogen fluoride concentration was about 95 mass ppm (Examples 1-3, 1-7, and 1-11). This improvement is caused by the fact that the decomposition of the monochelate complex (1a) during the initial charge is accelerated by the effect of hydrogen fluoride so as to further enhance the formation of an SEI that highly contributes to the improvement of performance. In addition, it was observed that when the hydrogen fluoride concentration was about 193 mass ppm (Examples 1-4, 1-8, and 1-12), the capacity retention was slightly decreased, compared to the result when the hydrogen fluoride concentration was about 95 mass ppm. This result is thought to be caused by adverse effects (elution of metal and corrosion of member) on the electrode member by the high-concentration hydrogen fluoride.

It is recognized that the decomposition of the monochelate complex (1a) during the initial charge is accelerated by the addition of hydrogen fluoride to simultaneously cause an improvement in the capacity retention after the cycle test and a decrease in the capacity retention after the cycle test due to the adverse effects on the electrode member. Further, in a long-term cycle test, the adverse effects on the electrode member may become apparent even in a battery having a hydrogen fluoride concentration of about 95 mass ppm. Accordingly, by considering the balance between the effect of reducing the gas amount and the longer-term influence on the electrode member, the upper limit of the addition amount of hydrogen fluoride is desirably about half of 95 mass ppm, i.e., 50 mass ppm.

Regarding monochelate complex (1i), the results were absolutely the same as those in the monochelate complex (1a). It was observed that in all cases in which the addition amounts of the monochelate complex (1i) were 0.3 mass % (Comparative Example 1-7 and Examples 1-19 to 1-22), 1.5 mass % (Comparative Example 1-8 and Examples 1-23 to 1-26), and 3.0 mass % (Comparative Example 1-9 and Examples 1-27 to 1-30), the gas amounts after the cycle test were reduced by using the electrolytes according to the Examples in which the hydrogen fluoride concentration was "5 mass ppm or more and less than 200 mass ppm", compared to the cases of using the electrolytes according to the Comparative Examples in which the hydrogen fluoride concentration was less than 5 mass ppm. It was also observed that the effect of reducing the gas amount was enhanced with an increase in the hydrogen fluoride concentration. In addition, regarding the capacity retention after cycle, although no improvement or little improvement in the effect was observed in Examples in which the hydrogen fluoride concentration was about 9 mass ppm or about 18 mass ppm (Examples 1-19 and 1-20, 1-23 and 1-24, and 1-27 and 1-28), an obvious improvement was observed when the hydrogen fluoride concentration was about 95 mass ppm (Examples 1-21, 1-25, and 1-29). This improvement is caused by the fact that the decomposition of the monochelate complex (1i) during the initial charge is accelerated by the effect of hydrogen fluoride to further enhance the formation of an SEI that highly contributes to the improvement of performance. In addition, it was observed that when the hydrogen fluoride concentration was about 193 mass ppm (Examples 1-22, 1-26, and 1-30), the capacity retention was slightly decreased, compared to the result when the hydrogen fluoride concentration was about 95 mass ppm. This result is thought to be caused by adverse effects (elution of metal and corrosion of member) on the electrode member by the high-concentration hydrogen fluoride.

Even in the cases of using other monochelate complexes (1d), (1g), (1h), (1p), (2a), (2g), (2i), and (2o), similarly, a decrease in the gas generation amount after the cycle test was observed according to the increase in the hydrogen fluoride concentration from about 3 mass ppm to about 9 mass ppm and then to about 193 mass ppm.

Finally, the results in batteries using LCO as the positive electrodes and in batteries using NCM811 as the positive electrodes were compared (Reference Example 1-1 and Comparative Example 1-2, Reference Example 1-2 and Comparative Example 1-6, Reference Example 1-3 and Comparative Example 1-8, and Reference Example 1-4 and Comparative Example 1-12). Although the batteries had the same size and approximately the same mass of the active material applied onto the positive electrodes, the gas generation amount after the cycle test was significantly smaller in every battery using LCO as the positive electrode, and it was confirmed that the gas generation (the problem to be solved by the present invention) had become a major problem due to using an NCM811 positive electrode containing nickel.

[Evaluation of Non-Aqueous Electrolyte Battery B]

The results of examples and comparative examples of non-aqueous electrolyte battery B having a configuration using NCM811 as the positive electrode and silicon-containing graphite as the negative electrode will now be described.

The measurement results of a battery using electrolyte 103 were defined as the results of Reference Example 2-1, the measurement results of a battery using electrolyte 55 were defined as the results of Comparative Example 2-1, and the measurement results of batteries using electrolytes 56 and 57 were defined as the results of Examples 2-1 and 2-2, respectively. Table 9 shows the relative values of Reference Example 2-1 and Examples 2-1 and 2-2 when the value of Comparative Example 2-1 was defined as 100.

The measurement results of a battery using electrolyte 58 were defined as the results of Comparative Example 2-2, and the measurement results of batteries using electrolytes 59 and 60 were defined as the results of Examples 2-3 and 2-4, respectively. Table 9 shows the relative values of Examples 2-3 and 2-4 when the value of Comparative Example 2-2 was defined as 100.

The measurement results of a battery using electrolyte 61 were defined as the results of Comparative Example 2-3, and the measurement results of batteries using electrolytes 62 and 63 were defined as the results of Examples 2-5 and 2-6, respectively. Table 9 shows the relative values of Examples 2-5 and 2-6 when the value of Comparative Example 2-3 was defined as 100.

The measurement results of a battery using electrolyte 103 were defined as the results of Reference Example 2-2, the measurement results of a battery using electrolyte 64 were defined as the results of Comparative Example 2-4, and the measurement results of batteries using electrolytes 65 and 66 were defined as the results of Examples 2-7 and 2-8, respectively. Table 9 shows the relative values of Reference Example 2-2 and Examples 2-7 and 2-8 when the value of Comparative Example 2-4 was defined as 100.

TABLE 9

| | | | Non-aqueous electrolyte battery B | | | | | |
|---|---|---|---|---|---|---|---|---|
| | Non-aqueous electrolyte No | Complex/ addition amount [mass %] | HF concentration in (I) to (III) [mass ppm] | LiPO$_2$F$_2$ [mass %] | Positive electrode | Negative electrode | Gas amount after cycle | Capacity retention |
| Reference Example 2-1 | 103 | None | 3.00 | 0.5 | NCM811 | silicon-containing graphite | 98.2 | — |
| Comparative Example 2-1 | 55 | 1a/1.5 | 3.00~≤3.45 | None | | | 100.0 | 100.0 |
| Example 2-1 | 56 | | 15.00~≤15.45 | None | | | 95.8 | 100.1 |
| Example 2-2 | 57 | | | 0.5 | | | 91.8 | 102.5 |
| Comparative Example 2-2 | 58 | 1d/1.5 | 3.00~≤3.30 | None | | | 100.0 | 100.0 |
| Example 2-3 | 59 | | 15.00~≤15.30 | None | | | 96.6 | 100.2 |
| Example 2-4 | 60 | | | 0.5 | | | 93.9 | 104.1 |
| Comparative Example 2-3 | 61 | 1h/1.0 | 3.00~≤3.20 | None | | | 100.0 | 100.0 |
| Example 2-5 | 62 | | 15.00~≤15.20 | None | | | 92.5 | 100.1 |
| Example 2-6 | 63 | | | 0.5 | | | 88.9 | 106.5 |
| Reference Example 2-2 | 103 | None | 3.00 | 0.5 | | | 98.7 | — |
| Comparative Example 2-4 | 64 | 1i/1.5 | 3.00~≤3.30 | None | | | 100.0 | 100.0 |
| Example 2-7 | 65 | | 15.00~≤15.30 | None | | | 95.7 | 100.0 |
| Example 2-8 | 66 | | | 0.5 | | | 92.1 | 101.9 |

Even in batteries having a configuration using the positive electrode of NCM811 without change and changing the negative electrode to silicon-containing graphite, regardless of the type of the monochelate complex, the gas generation amount after the cycle test was obviously reduced by using the electrolytes according to the Examples in which the hydrogen fluoride concentration was "5 mass ppm or more and less than 200 mass ppm", compared to the cases of using the electrolytes according to the Comparative Examples in which the hydrogen fluoride concentration was less than 5 mass ppm (for example, comparison between Comparative Example 2-1 and Example 2-1, Comparative Example 2-2 and Example 2-3, Comparative Example 2-3 and Example 2-5, and Comparative Example 2-4 and Example 2-7). However, when compared to the system of an artificial graphite negative electrode (comparison between Examples 1-6 and 2-1 and between Examples 1-24 and 2-7), although the hydrogen fluoride amount was not completely the same, it was inferred that the effect of reducing the amount of gas generation is small. Although influence due to a difference in the solvent may be present, it is recognized that this is caused by the fact that the silicon component as the negative electrode active material mainly reacts with a part of hydrogen fluoride to reduce the effective concentration of hydrogen fluoride in the electrolyte in the battery.

It was described that in the non-aqueous electrolyte battery A, in view of the adverse effects of hydrogen fluoride on the electrode member for a longer period, the upper limit of the concentration thereof is desirably about 50 mass ppm. However, when a silicon-containing negative electrode is used, since a certain amount of hydrogen fluoride is captured by silicon, the upper limit of the amount of hydrogen fluoride added to an initial electrolyte may be preferably higher than 50 mass ppm, and it is recognized that about 150 mass ppm is optimum.

Comparison between Reference Example 2-1 and Comparative Example 2-1 and comparison between Reference Example 2-2 and Comparative Example 2-4 demonstrate that the gas generation amounts after the cycle test were decreased by 1.8% and 1.3%, respectively, by adding LiPO$_2$F$_2$ only. In contrast, comparison between Examples 2-1 and 2-2 and comparison between Examples 2-7 and 2-8 demonstrate that when LiPO$_2$F$_2$ was further added to an electrolyte containing monochelate complex (1a) or (1i) and a predetermined amount of hydrogen fluoride, the gas generation amounts were decreased by 4.0% and 3.6%, respectively, and surprisingly the effect was doubled. This is probably caused by exhibition of an unexpected synergistic effect of "monochelate complex and hydrogen fluoride" with "LiPO$_2$F$_2$".

[Evaluation of Non-Aqueous Electrolyte Battery C]

The results of examples and comparative examples of non-aqueous electrolyte battery C having a configuration using NCA as the positive electrode and artificial graphite as the negative electrode will now be described.

The measurement results of a battery using electrolyte 104 were defined as the results of Reference Example 3-1, the measurement results of a battery using electrolyte 67 were defined as the results of Comparative Example 3-1, and the measurement results of batteries using electrolytes 68 and 69 were defined as the results of Examples 3-1 and 3-2, respectively. Table 10 shows the relative values of Reference Example 3-1 and Examples 3-1 and 3-2 when the value of Comparative Example 3-1 was defined as 100.

The measurement results of a battery using electrolyte 70 were defined as the results of Comparative Example 3-2, and the measurement results of batteries using electrolytes 71 and 72 were defined as the results of Examples 3-3 and 3-4, respectively. Table 10 shows the relative values of Examples 3-3 and 3-4 when the value of Comparative Example 3-2 was defined as 100.

The measurement results of a battery using electrolyte 104 were defined as the results of Reference Example 3-2, the measurement results of a battery using electrolyte 73 were defined as the results of Comparative Example 3-3, and the measurement results of batteries using electrolytes 74 and 75 were defined as the results of Examples 3-5 and 3-6, respectively. Table 10 shows the relative values of Reference Example 3-2 and Examples 3-5 and 3-6 when the value of Comparative Example 3-3 was defined as 100.

The measurement results of a battery using electrolyte 76 were defined as the results of Comparative Example 3-4, and the measurement results of batteries using electrolytes 77 and 78 were defined as the results of Examples 3-7 and 3-8, respectively. Table 10 shows the relative values of Examples 3-7 and 3-8 when the value of Comparative Example 3-4 was defined as 100.

using NCA as the positive electrode and silicon-containing graphite as the negative electrode will now be described.

The measurement results of a battery using electrolyte 105 were defined as the results of Reference Example 4-1, the measurement results of a battery using electrolyte 79

TABLE 10

| | Non-aqueous electrolyte battery C | | | | | | | |
|---|---|---|---|---|---|---|---|---|
| | Non-aqueous electrolyte No | Complex/ addition amount [mass %] | HF concentration in (I) to (III) [mass ppm] | LiFSI [mass %] | Positive electrode | Negative electrode | Gas amount after cycle | Capacity retention |
| Reference Example 3-1 | 104 | None | 3.00 | 0.5 | NCA | artificial graphite | 99.2 | — |
| Comparative Example 3-1 | 67 | 1a/1.5 | 3.00~≤3.45 | None | | | 100.0 | 100.0 |
| Example 3-1 | 68 | | 17.00~≤17.45 | None | | | 86.0 | 100.4 |
| Example 3-2 | 69 | | | 0.5 | | | 84.8 | 101.8 |
| Comparative Example 3-2 | 70 | 1g/5.1 | 3.00~≤3.30 | None | | | 100.0 | 100.0 |
| Example 3-3 | 71 | | 17.00~≤17.30 | None | | | 88.6 | 100.1 |
| Example 3-4 | 72 | | | 0.5 | | | 88.0 | 102.3 |
| Reference Example 3-2 | 104 | None | 3.00 | 0.5 | | | 99.3 | — |
| Comparative Example 3-3 | 73 | 1i/1.5 | 3.00~≤3.30 | None | | | 100.0 | 100.0 |
| Example 3-5 | 74 | | 17.00~≤17.30 | None | | | 91.1 | 100.5 |
| Example 3-6 | 75 | | | 0.5 | | | 89.3 | 101.4 |
| Comparative Example 3-4 | 76 | 1p/1.5 | 3.00~≤3.30 | None | | | 100.0 | 100.0 |
| Example 3-7 | 77 | | 17.00~≤17.30 | None | | | 92.3 | 100.3 |
| Example 3-8 | 78 | | | 0.5 | | | 91.9 | 105.3 |

Even in batteries having a configuration using the negative electrode of artificial graphite without change and changing the positive electrode to NCA, regardless of the type of the monochelate complexes, similarly, the gas generation amount after the cycle test was obviously reduced by using the electrolytes according to the Examples in which the hydrogen fluoride concentration was "5 mass ppm or more and less than 200 mass ppm", compared to the cases of using the electrolytes according to the Comparative Examples in which the hydrogen fluoride concentration was less than 5 mass ppm (comparison between Comparative Example 3-1 and Example 3-1, Comparative Example 3-2 and Example 3-3, Comparative Example 3-3 and Example 3-5, and Comparative Example 3-4 and Example 3-7).

In addition, comparison between Reference Example 3-1 and Comparative Example 3-1 and between Reference Example 3-2 and Comparative Example 3-3 demonstrate that, although it was slight, the gas generation amounts after the cycle test were decreased by 0.8% and 0.7%, respectively, by adding LiFSI only.

In contrast, comparison between Examples 3-1 and 3-2 and comparison between Examples 3-5 and 3-6 demonstrate that when LiFSI was further added to the electrolyte containing monochelate complex (1a) or (1i) and a predetermined amount of hydrogen fluoride, the gas generation amounts were decreased by 1.2% and 1.8%, respectively, and surprisingly the effect was doubled. This is probably caused by exhibition of an unexpected synergistic effect of "monochelate complex and hydrogen fluoride" with "LiFSI".

[Evaluation of Non-Aqueous Electrolyte Battery D]

The results of examples and comparative examples of non-aqueous electrolyte battery D having a configuration were defined as the results of Comparative Example 4-1, and the measurement results of batteries using electrolytes 80 and 81 were defined as the results of Examples 4-1 and 4-2, respectively. Table 11 shows the relative values of Reference Example 4-1 and Examples 4-1 and 4-2 when each value of Comparative Example 4-1 was defined as 100.

The measurement results of a battery using electrolyte 105 were defined as the results of Reference Example 4-2, the measurement results of a battery using electrolyte 82 were defined as the results of Comparative Example 4-2, and the measurement results of batteries using electrolytes 83 and 84 were defined as the results of Examples 4-3 and 4-4, respectively. Table 11 shows the relative values of Reference Example 4-2 and Examples 4-3 and 4-4 when the value of Comparative Example 4-2 was defined as 100.

The measurement results of a battery using electrolyte 85 were defined as the results of Comparative Example 4-3, and the measurement results of batteries using electrolytes 86 and 87 were defined as the results of Examples 4-5 and 4-6, respectively. Table 11 shows the relative values of Examples 4-5 and 4-6 when the value of Comparative Example 4-3 was defined as 100.

The measurement results of a battery using electrolyte 88 were defined as the results of Comparative Example 4-4, and the measurement results of batteries using electrolytes 89 and 90 were defined as the results of Examples 4-7 and 4-8, respectively. Table 11 shows the relative values of Examples 4-7 and 4-8 when the value of Comparative Example 4-4 was defined as 100.

TABLE 11

| | | | Non-aqueous electrolyte battery D | | | | | |
|---|---|---|---|---|---|---|---|---|
| | Non-aqueous electrolyte No | Complex/ addition amount [mass %] | HF concentration in (I) to (III) [mass ppm] | LiPO$_2$F$_2$ [mass %] | Positive electrode | Negative electrode | Gas amount after cycle | Capacity retention |
| Reference Example 4-1 | 105 | None | 3.00 | 0.5 | NCA | silicon-containing graphite | 98.5 | — |
| Comparative Example 4-1 | 79 | 1a/1.5 | 3.00~≤3.45 | None | | | 100.0 | 100.0 |
| Example 4-1 | 80 | | 17.00~≤17.45 | None | | | 93.5 | 100.3 |
| Example 4-2 | 81 | | | 0.5 | | | 90.3 | 102.5 |
| Reference Example 4-2 | 105 | None | 3.00 | 0.5 | | | 98.2 | — |
| Comparative Example 4-2 | 82 | 1i/1.5 | 3.00~≤3.30 | None | | | 100.0 | 100.0 |
| Example 4-3 | 83 | | 17.00~≤17.30 | None | | | 94.2 | 100.4 |
| Example 4-4 | 84 | | | 0.5 | | | 91.3 | 101.9 |
| Comparative Example 4-3 | 85 | 1p/1.5 | 3.00~≤3.30 | None | | | 100.0 | 100.0 |
| Example 4-5 | 86 | | 17.00~≤17.30 | None | | | 96.7 | 100.3 |
| Example 4-6 | 87 | | | 0.5 | | | 93.4 | 104.6 |
| Comparative Example 4-4 | 88 | 2g/1.5 | 3.00~≤3.30 | None | | | 100.0 | 100.0 |
| Example 4-7 | 89 | | 17.00~≤17.30 | None | | | 93.8 | 100.2 |
| Example 4-8 | 90 | | | 0.5 | | | 91.7 | 103.3 |

Even in batteries having a configuration in which the positive electrode was changed to NCA and the negative electrode was changed to silicon-containing graphite, regardless of the type of the monochelate complexes, the gas generation amount after the cycle test was obviously reduced by using the electrolytes according to the Examples in which the hydrogen fluoride concentration was "5 mass ppm or more and less than 200 mass ppm", compared to the cases of using the electrolytes according to the Comparative Examples in which the hydrogen fluoride concentration was less than 5 mass ppm (for example, comparison between Comparative Example 4-1 and Example 4-1, Comparative Example 4-2 and Example 4-3, Comparative Example 4-3 and Example 4-5, and Comparative Example 4-4 and Example 4-7). However, when compared to the system of an artificial graphite negative electrode (comparison between Examples 3-1 and 4-1 and between Examples 3-5 and 4-3), it was inferred that the effect of reducing the amount of gas generation is small. Although an influence due to a difference in the solvent may be present, it is recognized that this is caused by the fact that the silicon component as the negative electrode active material mainly reacts with a part of hydrogen fluoride to reduce the effective concentration of hydrogen fluoride in the electrolyte in the battery.

It was described that in the non-aqueous electrolyte battery A (and C), in view of the adverse effects of hydrogen fluoride on the electrode member for a longer period, the upper limit of the concentration thereof is desirably about 50 mass ppm. However, when a silicon-containing negative electrode is used, since a certain amount of hydrogen fluoride is captured by silicon, the upper limit of the amount of hydrogen fluoride added to an initial electrolyte may be preferably higher than 50 mass ppm, and it is recognized that about 150 mass ppm is optimum.

In addition, comparison between Reference Example 4-1 and Comparative Example 4-1 and comparison between Reference Example 4-2 and Comparative Example 4-2 demonstrate that the gas generation amounts after the cycle test were decreased by 1.5% and 1.8%, respectively, by adding LiPO$_2$F$_2$ only. In contrast, comparison between Examples 4-1 and 4-2 and comparison between Examples 4-3 and 4-4 demonstrate that when LiPO$_2$F$_2$ was further added to an electrolyte containing monochelate complex (1a) or (1i) and a predetermined amount of hydrogen fluoride, the gas generation amounts were decreased by 3.2% and 2.9%, respectively, and the effect was doubled in the same manner as in non-aqueous electrolyte battery B.

[Evaluation of Non-Aqueous Electrolyte Battery E]

The results of examples and comparative examples of non-aqueous electrolyte battery E having a configuration using NCM111 as the positive electrode and natural graphite as the negative electrode will now be described.

The measurement results of a battery using electrolyte 106 were defined as the results of Reference Example 5-1, the measurement results of a battery using electrolyte 91 were defined as the results of Comparative Example 5-1, and the measurement results of batteries using electrolytes 92 and 93 were defined as the results of Examples 5-1 and 5-2, respectively. Table 12 shows the relative values of Reference Example 5-1 and Examples 5-1 and 5-2 when the value of Comparative Example 5-1 was defined as 100.

The measurement results of a battery using electrolyte 106 were defined as the results of Reference Example 5-2, the measurement results of a battery using electrolyte 94 were defined as the results of Comparative Example 5-2, and the measurement results of batteries using electrolytes 95 and 96 were defined as the results of Examples 5-3 and 5-4, respectively. Table 12 shows the relative values of Reference Example 5-2 and Examples 5-3 and 5-4 when the value of Comparative Example 5-2 was defined as 100.

The measurement results of a battery using electrolyte 97 were defined as the results of Comparative Example 5-3, and the measurement results of batteries using electrolytes 98 and 99 were defined as the results of Examples 5-5 and 5-6, respectively. Table 12 shows the relative values of Examples 5-5 and 5-6 when the value of Comparative Example 5-3 was defined as 100.

The measurement results of a battery using electrolyte 100 were defined as the results of Comparative Example 5-4, and the measurement results of batteries using electrolytes 101 and 102 were defined as the results of Examples 5-7 and 5-8, respectively. Table 12 shows the relative values of Examples 5-7 and 5-8 when the value of Comparative Example 5-4 was defined as 100.

TABLE 12

Non-aqueous electrolyte battery E

| | Non-aqueous electrolyte No | Complex/ addition amount [mass %] | HF concentration in (I) to (III) [mass ppm] | LiSO₃F [mass %] | Positive electrode | Negative electrode | Gas amount after cycle | Capacity retention |
|---|---|---|---|---|---|---|---|---|
| Reference Example 5-1 | 106 | None | 3.00 | 0.5 | MCM111 | natural graphite | 99.6 | — |
| Comparative Example 5-1 | 91 | 1a/1.5 | 3.00~≤3.45 | None | | | 100.0 | 100.0 |
| Example 5-1 | 92 | | 18.00~≤18.45 | None | | | 89.0 | 100.4 |
| Example 5-2 | 93 | | | 0.5 | | | 88.1 | 103.5 |
| Reference Example 5-2 | 106 | None | 3.00 | 0.5 | | | 99.3 | — |
| Comparative Example 5-2 | 94 | 1i/1.5 | 3.00~≤3.30 | None | | | 100.0 | 100.0 |
| Example 5-3 | 95 | | 18.00~≤18.30 | None | | | 90.4 | 100.4 |
| Example 5-4 | 96 | | | 0.5 | | | 89.0 | 102.5 |
| Comparative Example 5-3 | 97 | 1d/1.5 | 3.00~≤3.30 | None | | | 100.0 | 100.0 |
| Example 5-5 | 98 | | 18.00~≤18.30 | None | | | 90.7 | 100.2 |
| Example 5-6 | 99 | | | 0.5 | | | 90.1 | 104.2 |
| Comparative Example 5-4 | 100 | 2i/1.5 | 3.00~≤3.30 | None | | | 100.0 | 100.0 |
| Example 5-7 | 101 | | 18.00~≤18.30 | None | | | 91.8 | 100.1 |
| Example 5-8 | 102 | | | 0.5 | | | 89.8 | 103.3 |

Even in batteries having a configuration using a positive electrode of NCM111 and a negative electrode of natural graphite, regardless of the type of the monochelate complex, the gas generation amount after the cycle test was obviously reduced by using the electrolytes according to the Examples in which the hydrogen fluoride concentration was "5 mass ppm or more and less than 200 mass ppm", compared to the cases of using the electrolytes according to the Comparative Examples in which the hydrogen fluoride concentration was less than 5 mass ppm (comparison between Comparative Example 5-1 and Example 5-1, Comparative Example 5-2 and Example 5-3, Comparative Example 5-3 and Example 5-5, and Comparative Example 5-4 and Example 5-7).

In addition, comparison between Reference Example 5-1 and Comparative Example 5-1 and between Reference Example 5-2 and Comparative Example 5-2 demonstrate that, although it was slight, the gas generation amounts after the cycle test were decreased by 0.4% and 0.7%, respectively, by adding LiSO₃F only.

In contrast, comparison between Examples 5-1 and 5-2 and comparison between Examples 5-3 and 5-4 demonstrate that when LiSO₃F was further added to the electrolyte containing monochelate complex (1a) or (1i) and a predetermined amount of hydrogen fluoride, the gas generation amounts were decreased by 0.9% and 1.4%, respectively, and surprisingly the effect was doubled. This is probably caused by exhibition of an unexpected synergistic effect of "monochelate complex and hydrogen fluoride" with "LiSO₃F".

[Preparation of Non-Aqueous Electrolytes 107 to 121]

Monochelate complexes (1a) and (1i) were added to reference electrolyte A-0 such that the concentrations were each 0.15 mass %, followed by stirring for 1 hour to prepare non-aqueous electrolyte 107. In each of the monochelate complexes (1a) and (1i) used here, the cation was lithium, and free acid concentration therein was 30 mass ppm or less. Examples of the free acid other than hydrogen fluoride include oxalic acid and monolithium oxalate when the ligands of monochelate complexes (1a) and (1i) are oxalic acid; and monochelate complexes (1a) and (1i) whose cations are protons. If the free acids are all hydrogen fluoride, the maximum amount thereof is 30 mass ppm in both monochelate complexes. For example, when 1.5 mass % of monochelate complex (1a) and 1.5 mass % of monochelate complex (1i) are added, the hydrogen fluoride concentration derived from each of the monochelate complexes (1a) and (1i) in the electrolyte is 0.45 mass ppm or less, and the total is 0.9 mass ppm or less. The same applies to when monochelate complexes (1a) and (1i) are used in combination.

Each monochelate complex (cation is lithium) was added to each reference electrolyte so as to give the concentrations shown in Table 13, followed by stirring for 1 hour to prepare non-aqueous electrolytes 108 to 121.

TABLE 13

| | Monochelate complex (M = Li) | | | Reference electrolyte | |
|---|---|---|---|---|---|
| Non-aqueous electrolyte | Compound No. | Concentration [mass %] | Content of HF [mass ppm] | No. | HF concentration [mass ppm] |
| 107 | 1a | 0.15 | ≤0.09 | A-0 | 3.00 |
| 108 | 1i | 0.15 | | A-1 | 9.00 |
| 109 | | | | A-2 | 18.00 |
| 110 | | | | A-3 | 95.00 |
| 111 | | | | A-4 | 193.00 |
| 112 | 1a | 0.75 | ≤0.45 | A-0 | 3.00 |
| 113 | 1i | 0.75 | | A-1 | 9.00 |
| 114 | | | | A-2 | 18.00 |
| 115 | | | | A-3 | 95.00 |
| 116 | | | | A-4 | 193.00 |
| 117 | 1a | 1.50 | ≤0.90 | A-0 | 3.00 |
| 118 | 1i | 1.50 | | A-1 | 9.00 |
| 119 | | | | A-2 | 18.00 |
| 120 | | | | A-3 | 95.00 |
| 121 | | | | A-4 | 193.00 |

[Evaluation of Non-Aqueous Electrolyte Battery A]

The results of examples and comparative examples of non-aqueous electrolyte battery A having a configuration using NCM811 as the positive electrode and artificial graphite as the negative electrode will now be described. Incidentally, the results of non-aqueous electrolyte battery F configured using LCO as the positive electrode and artificial graphite as the negative electrode are shown as the results of a reference example.

The measurement results of a battery using electrolyte 107 were defined as the results of Comparative Example 6-1, and the measurement results of batteries using electrolytes 108 to 111 were defined as the results of Examples 6-1 to 6-4, respectively. Table 14 shows the relative values of Examples 6-1 to 6-4 when the value of Comparative Example 6-1 was defined as 100.

The measurement results of a battery using electrolyte 112 were defined as the results of Comparative Example 6-2, and the measurement results of batteries using electrolytes 113 to 116 were defined as the results of Examples 6-5 to 6-8, respectively. In addition, the measurement results of a battery using an LCO positive electrode and electrolyte 112 were defined as the results of Reference Example 6-1.

Table 14 shows the relative values of Reference Example 6-1 and Examples 6-5 to 6-8 when the h value of Comparative Example 6-2 was defined as 100.

The measurement results of a battery using electrolyte 117 were defined as the results of Comparative Example 6-3, and the measurement results of batteries using electrolytes 118 to 121 were defined as the results of Examples 6-9 to 6-12, respectively. Table 14 shows the relative values of Examples 6-9 to 6-12 when the value of Comparative Example 6-3 was defined as 100

TABLE 14

| | Non-aqueous electrolyte battery A (Reference Example 6-1: non-aqueous electrolyte battery F) | | | | | | |
|---|---|---|---|---|---|---|---|
| | Non-aqueous electrolyte No | Complex type/ addition amount [mass %] | HF concentration in (I) to (III) [mass ppm] | Positive electrode | Negative electrode | Gas amount after cycle | Capacity retention |
| Comparative Example 6-1 | 107 | 1a/01.5 1i/0.15 | 3.00~≤3.09 | NCM811 | artificial graphite | 100.0 | 100.0 |
| Example 6-1 | 108 | | 9.00~≤9.09 | | | 98.2 | 100.0 |
| Example 6-2 | 109 | | 18.00~≤18.09 | | | 91.2 | 100.2 |
| Example 6-3 | 110 | | 95.00~≤95.09 | | | 81.5 | 101.6 |
| Example 6-4 | 111 | | 193.00~≤193.09 | | | 77.5 | 100.0 |
| Reference Example 6-1 | 112 | 1a/0.75 1i/0.75 | 3.00~≤3.45 | LCO | | 66.9 | — |
| Comparative Example 6-2 | 112 | | 3.00~≤3.45 | NCM811 | | 100.0 | 100.0 |
| Example 6-5 | 113 | | 9.00~≤9.45 | | | 98.2 | 100.0 |
| Example 6-6 | 114 | | 18.00~≤18.45 | | | 90.0 | 100.5 |
| Example 6-7 | 115 | | 95.00~≤95.45 | | | 80.7 | 101.5 |
| Example 6-8 | 116 | | 193.00~≤193.45 | | | 75.8 | 100.8 |
| Comparative Example 6-3 | 117 | 1a/1.50 1i/1.50 | 3.00~≤3.90 | NCM811 | | 100.0 | 100.0 |
| Example 6-9 | 118 | | 9.00~≤9.90 | | | 98.5 | 100.0 |
| Example 6-10 | 119 | | 18.00~≤18.90 | | | 90.5 | 100.4 |
| Example 6-11 | 120 | | 95.00~≤95.90 | | | 79.8 | 101.3 |
| Example 6-12 | 121 | | 193.00~≤193.90 | | | 75.9 | 100.4 |

It was confirmed that the same effect was obtained even in a system in which a plurality of types of monochelate complexes were used in combination.

[Preparation of Non-Aqueous Electrolytes 122 to 133]

Non-aqueous electrolytes 122 to 133 were prepared by the same procedure as in non-aqueous electrolyte 114 except that the compounds shown in Table 15 as additional components were dissolved at the concentrations shown in Table 15.

TABLE 15

| | Monochelate complex (M = Li) | | | Reference electrolyte | | Additional component | |
|---|---|---|---|---|---|---|---|
| Non-aqueous electrolyte | Compound No. | Concentration [mass %] | Content of HF [mass ppm] | No. | HF concentration [mass ppm] | Type | Concentration [mass %] |
| 112 | 1a | 0.75 | ≤0.45 | A-0 | 3.00 | None | — |
| 114 | 1i | 0.75 | | A-2 | 18.00 | None | — |
| 122 | | | | A-2 | 18.00 | LiPO$_2$F$_2$ | 0.5 |
| 123 | | | | A-2 | 18.00 | LiSO$_3$F | 0.5 |
| 124 | | | | A-2 | 18.00 | LiFSI | 0.5 |
| 125 | | | | A-2 | 18.00 | (4-1) | 0.5 |
| 126 | 1a | 1.5 | ≤0.45 | A-2 | 18.00 | MSF | 0.5 |
| 127 | | | | A-2 | 18.00 | 1,2-BFSB | 0.5 |
| 128 | | | | A-2 | 18.00 | Dad | 0.5 |
| 129 | | | | A-2 | 18.00 | (4-1) | 0.5 |
| 130 | 1i | 1.5 | ≤0.30 | A-2 | 18.00 | EtSF | 0.5 |
| 131 | | | | A-2 | 18.00 | 1,3-BFSB | 0.5 |
| 132 | | | | A-2 | 18.00 | (4-3) | 0.5 |
| 133 | | | | A-2 | 18.00 | PDFP | 0.5 |

[Evaluation of Non-Aqueous Electrolyte Battery A]

The results of examples and comparative examples of non-aqueous electrolyte battery A having a configuration using NCM811 as the positive electrode and artificial graphite as the negative electrode will now be described. Incidentally, the results of non-aqueous electrolyte battery F configured using LCO as the positive electrode and artificial graphite as the negative electrode are shown as the results of reference examples.

The measurement results of batteries using electrolytes 112, 6, and 30 were defined as the results of Comparative Examples 6-2, 1-2, and 1-8, respectively, and the measurement results of batteries using electrolytes 114, 122 to 125, 8, 126 to 129, 32, and 130 to 133 were defined as the results of Examples 6-6, 6-13 to 6-16, 1-6, 6-17 to 6-20, 1-24, and 6-21 to 6-24, respectively.

In addition, the measurement results of batteries using an LCO positive electrode and electrolytes 112, 6, and 30 were defined as the results of Reference Examples 6-1, 1-1, and 1-3.

Table 16 shows the relative values of Reference Example 6-1 and Examples 6-6 and 6-13 to 6-16 when the value of Comparative Example 6-2 was defined as 100, the relative values of Reference Example 1-1 and Examples 1-6 and 6-17 to 6-20 when the value of Comparative Example 1-2 was defined as 100, and the relative values of Reference Example 1-3 and Examples 1-24 and 6-21 to 6-24 when the value of Comparative Example 1-8 was defined as 100.

observed that an unexpected synergistic effect of "monochelate complexes and hydrogen fluoride" with an "additional component" was exhibited.

What are claimed are:

1. An electrolyte for a non-aqueous electrolyte battery comprising a positive electrode including at least one selected from the group consisting of oxides containing nickel and phosphates containing nickel as a positive electrode active material, the electrolyte comprising:

(I) a non-aqueous organic solvent;

(II) a fluorine-containing solute being an ionic salt, wherein said fluorine-containing solute is contained in an amount of 0.5 mol/L or more and 2.5 mol/L or less based on a total amount of the electrolyte;

(III) at least one additive selected from the group consisting of compounds represented by formulae (1) and (2), wherein a content of said at least one additive is 0.01 mass % or more and 7.0 mass % or less based on a total amount of the components (I), (II), and (III); and (IV) hydrogen fluoride in an amount of 5 mass ppm or more and less than 200 mass ppm based on the total amount of the components (I), (II), and (III),

TABLE 16

| | Non-aqueous electrolyte battery A (Reference Example 6-1, 1-1 and 1-3: non-aqueous electrolyte battery F) | | | | | | |
|---|---|---|---|---|---|---|---|
| | Non-aqueous electrolyte No | Complex type/ addition amount [mass %] | HF concentration in (I) to (III) [mass ppm] | Positive electrode | Negative electrode | Gas amount after cycle | Capacity retention |
| Reference Example 6-1 | 112 | 1a/0.75 1i/0.75 | 3.00~≤3.45 | LCO | artificial graphite | 66.9 | — |
| Comparative Example 6-2 | 112 | | 3.00~≤3.45 | NCM811 | | 100.0 | 100.0 |
| Example 6-6 | 114 | | 18.00~≤18.45 | | | 90.0 | 100.5 |
| Example 6-13 | 122 | | 18.00~≤18.45 | | | 89.5 | 102.3 |
| Example 6-14 | 123 | | 18.00~≤18.45 | | | 90.5 | 103.3 |
| Example 6-15 | 124 | | 18.00~≤18.45 | | | 90.3 | 104.5 |
| Example 6-16 | 125 | | 18.00~≤18.45 | | | 82.1 | 104.1 |
| Reference Example 1-1 | 6 | 1a/1.5 | 3.00~≤3.45 | LCO | artificial graphite | 62.7 | — |
| Comparative Example 1-2 | 6 | | 3.00~≤3.45 | NCM811 | | 100.0 | 100.0 |
| Example 1-6 | 8 | | 18.00~≤18.45 | | | 88.4 | 100.1 |
| Example 6-17 | 126 | | 18.00~≤18.45 | | | 89.5 | 101.0 |
| Example 6-18 | 127 | | 18.00~≤18.45 | | | 89.3 | 103.8 |
| Example 6-19 | 128 | | 18.00~≤18.45 | | | 87.6 | 102.8 |
| Example 6-20 | 129 | | 18.00~≤18.45 | | | 87.2 | 101.9 |
| Reference Example 1-3 | 30 | 1i/1.5 | 3.00~≤3.30 | LCO | artificial graphite | 71.9 | — |
| Comparative Example 1-8 | 30 | | 3.00~≤3.30 | NCM811 | | 100.0 | 100.0 |
| Example 1-24 | 32 | | 18.00~≤18.30 | | | 91.3 | 100.5 |
| Example 6-21 | 130 | | 18.00~≤18.30 | | | 91.7 | 100.9 |
| Example 6-22 | 131 | | 18.00~≤18.30 | | | 91.3 | 103.4 |
| Example 6-23 | 132 | | 18.00~≤18.30 | | | 90.8 | 102.4 |
| Example 6-24 | 133 | | 18.00~≤18.30 | | | 91.5 | 102.4 |

Even in systems with different types of additional components, it was similarly observed that an unexpected synergistic effect of "monochelate complex and hydrogen fluoride" with an "additional component" was exhibited.

In addition, even in a system including a plurality of types of monochelate complexes in combination and further including an additional component, it was similarly

(2)

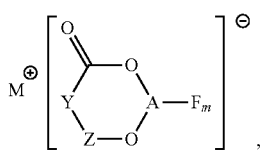

wherein M represents an alkali metal; A represents boron or phosphorus; F represents fluorine; and O represents oxygen; wherein when A is boron, m=2, wherein when A is phosphorus, m=4; and V and W each represents any one of a carbonyl group, a methylene group, C(CH$_3$)$_2$, C(CF$_3$)$_2$, CH(CF$_3$), CH(CH$_3$), or C(CH$_3$)(CF$_3$), and V and W optionally form one side of a cyclohexane ring, a cyclohexene ring, a cyclopentane ring, a cyclopentene ring, or an aromatic ring, and Y represents any one of a methylene group, a monofluoromethylene group, or a difluoromethylene group; and Z represents any one of a carbonyl group, C(CF$_3$)$_2$, C(CH$_3$)$_2$, CH(CF$_3$), CH(CH$_3$), C(CH$_3$)(CF$_3$), or a methylene group; wherein Y and Z optionally form one side of a cyclohexane ring, a cyclohexene ring, a cyclopentane ring, a cyclopentene ring, or an aromatic ring.

2. The electrolyte for a non-aqueous electrolyte battery according to claim 1, wherein the compound represented by formula (1) is at least one selected from the group consisting of following compounds (1a) to (1p):

(1a)
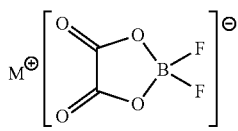

(1b)
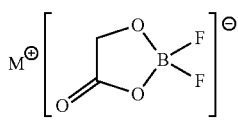

(1c)
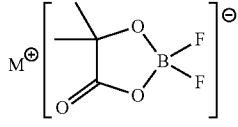

(1d)
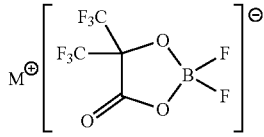

(1e)
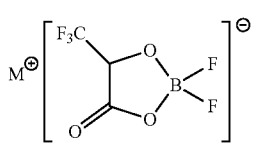

(1f)
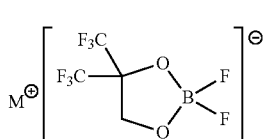

(1g)
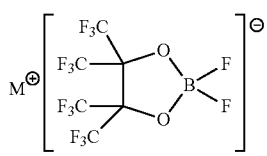

(1h)
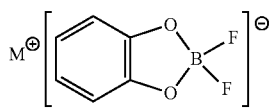

(1i)
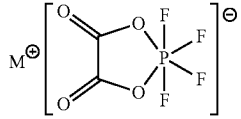

(1j)
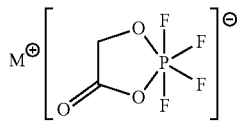

(1k)
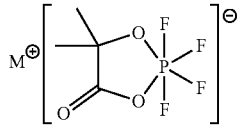

(1l)
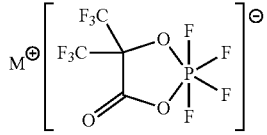

(1m)
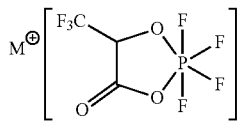

(1n)
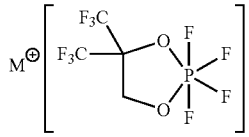

(1o)
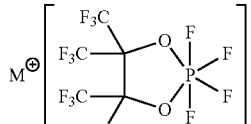

(1p)
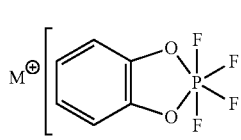

3. The electrolyte for a non-aqueous electrolyte battery according to claim 2, wherein the compound represented by formula (1) is at least one selected from the group consisting of the compounds (1a), (1d), (1g), (1h), (1i), (1o), and (1p); and M is lithium.

4. The electrolyte for a non-aqueous electrolyte battery according to claim 1, wherein the compound represented by formula (2) is at least one selected from the group consisting of the following compounds (2a) to (2p):
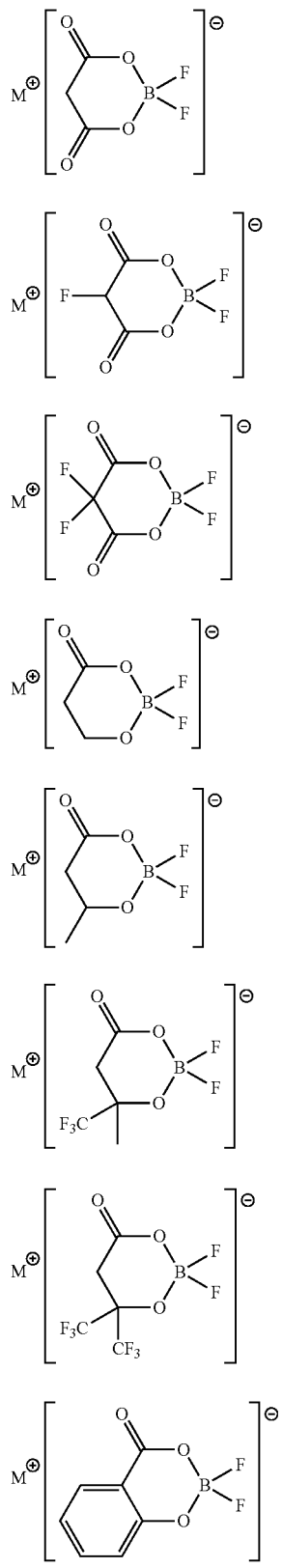
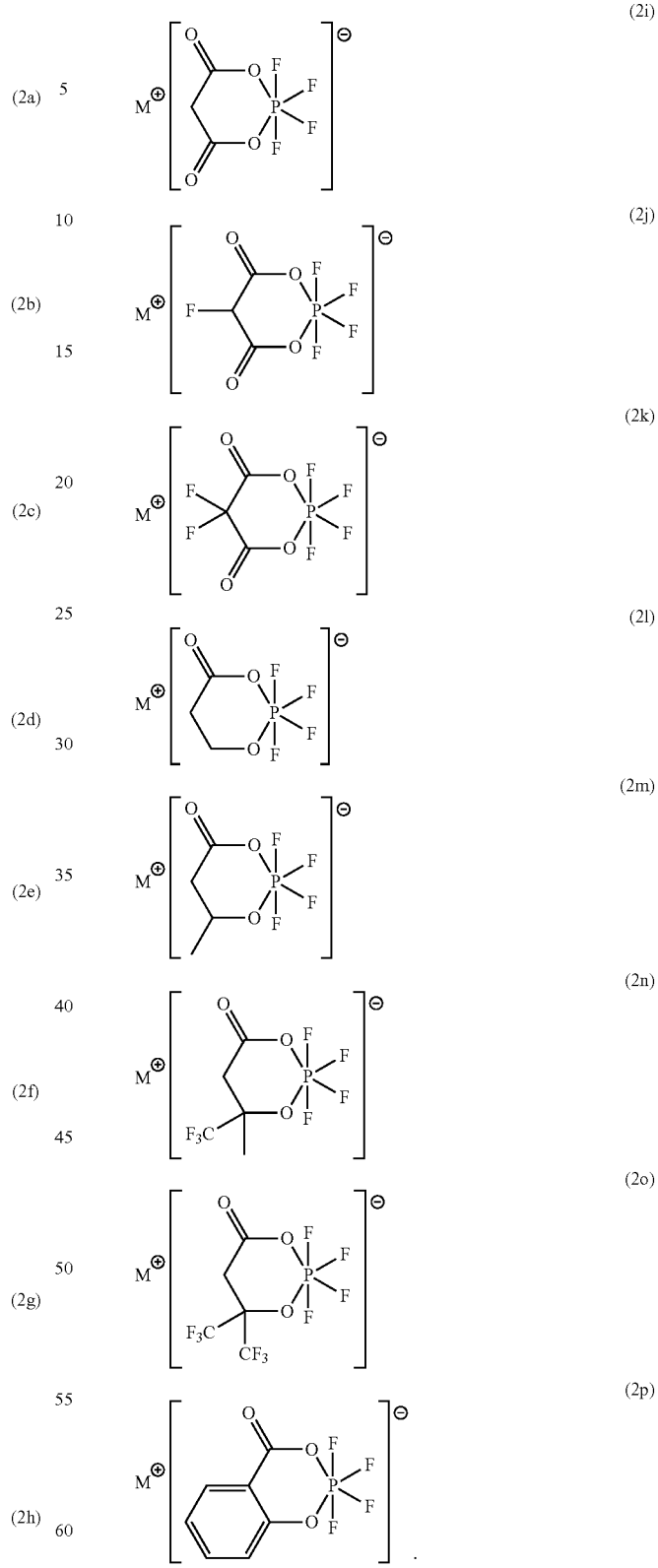
5. The electrolyte for a non-aqueous electrolyte battery according to claim 4, wherein the compound represented by formula (2) is at least one selected from the group consisting of the compounds (2a), (2g), (2i), and (2o); and M is lithium.

6. The electrolyte for a non-aqueous electrolyte battery according to claim 1, wherein the electrolyte contains hydrogen fluoride in an amount of 10 mass ppm or more and less than 150 mass ppm based on the total amount of the components (I), (II), and (III).

7. The electrolyte for a non-aqueous electrolyte battery according to claim 6, wherein the electrolyte contains hydrogen fluoride in an amount of 15 mass ppm or more and less than 100 mass ppm based on the total amount of the components (I), (II), and (III).

8. The electrolyte for a non-aqueous electrolyte battery according to claim 7, wherein the electrolyte contains hydrogen fluoride in an amount of 15 mass ppm or more and less than 50 mass ppm based on the total amount of the components (I), (II), and (III).

9. The electrolyte for a non-aqueous electrolyte battery according to claim 1, wherein a content of said at least one additive selected from the group consisting of the compounds represented by formulae (1) and (2) is 0.1 mass % or more and 5.0 mass % or less based on the total amount of the components (I), (II), and (III).

10. The electrolyte for a non-aqueous electrolyte battery according to claim 1, wherein said non-aqueous organic solvent is at least one selected from the group consisting of ethyl methyl carbonate, dimethyl carbonate, diethyl carbonate, methyl propyl carbonate, ethyl propyl carbonate, methyl butyl carbonate, 2,2,2-trifluoroethyl methyl carbonate, 2,2,2-trifluoroethyl ethyl carbonate, 2,2,2-trifluoroethyl propyl carbonate, bis(2,2,2-trifluoroethyl) carbonate, 1,1,1,3,3,3-hexafluoro-1-propyl methyl carbonate, 1,1,1,3,3,3-hexafluoro-1-propyl ethyl carbonate, 1,1,1,3,3,3-hexafluoro-1-propyl propyl carbonate, bis(1,1,1,3,3,3-hexafluoro-1-propyl) carbonate, ethylene carbonate, propylene carbonate, butylene carbonate, fluoroethylene carbonate, difluoroethylene carbonate, methyl acetate, ethyl acetate, methyl propionate, ethyl propionate, methyl 2-fluoropropionate, ethyl 2-fluoropropionate, diethyl ether, dibutyl ether, diisopropyl ether, 1,2-dimethoxyethane, tetrahydrofuran, 2-methyltetrahydrofuran, furan, tetrahydropyran, 1,3-dioxane, 1,4-dioxane, N,N-dimethylformamide, acetonitrile, propionitrile, dimethyl sulfoxide, sulfolane, γ-butyrolactone, and γ-valerolactone.

11. The electrolyte for a non-aqueous electrolyte battery according to claim 1, wherein the non-aqueous organic solvent contains at least one selected from the group consisting of cyclic carbonates and chain carbonates.

12. The electrolyte for a non-aqueous electrolyte battery according to claim 11, wherein the cyclic carbonate is at least one selected from the group consisting of ethylene carbonate, propylene carbonate, and fluoroethylene carbonate, and the chain carbonate is at least one selected from the group consisting of ethyl methyl carbonate, dimethyl carbonate, diethyl carbonate, and methyl propyl carbonate.

13. The electrolyte for a non-aqueous electrolyte battery according to claim 1, wherein the solute is an ionic salt composed of a pair of at least one cation selected from the group consisting of alkali metal ions and at least one anion selected from the group consisting of a hexafluorophosphate anion, a tetrafluoroborate anion, a trifluoromethanesulfonate anion, a fluorosulfonate anion, a bis(trifluoromethanesulfonyl)imide anion, a bis(fluorosulfonyl)imide anion, a (trifluoromethanesulfonyl)(fluorosulfonyl)imide anion, a bis(difluorophosphoryl)imide anion, a (difluorophosphoryl)(fluorosulfonyl)imide anion, and a (difluorophosphoryl)(trifluoromethanesulfonyl)imide anion.

14. The electrolyte for a non-aqueous electrolyte battery according to claim 13, wherein the cation of the solute is lithium, sodium, or potassium, and the anion is at least one selected from the group consisting of a hexafluorophosphate anion, a tetrafluoroborate anion, a trifluoromethanesulfonate anion, a bis(trifluoromethanesulfonyl)imide anion, a bis(fluorosulfonyl)imide anion, and a bis(difluorophosphoryl)imide anion.

15. The electrolyte for a non-aqueous electrolyte battery according to claim 1, comprising one or more compounds having an O=S—F bond or having an O=P—F bond as an additional component, in addition to the components (I), (II), (III), and (IV).

16. The electrolyte for a non-aqueous electrolyte battery according to claim 15, wherein the compound having an O=S—F bond is at least one selected from the group consisting of lithium bis(fluorosulfonyl)imide, lithium (trifluoromethanesulfonyl)(fluorosulfonyl)imide, lithium fluorosulfonate, methanesulfonyl fluoride, ethanesulfonyl fluoride, 1,2-bis(fluorosulfonyl)benzene, and 1,3-bis(fluorosulfonyl)benzene, and the compound having an O=P—F bond is at least one selected from the group consisting of lithium bis(difluorophosphoryl)imide, lithium difluorophosphate, lithium fluorophosphate, lithium ethylfluorophosphate, and phenyl difluorophosphate.

17. The electrolyte for a non-aqueous electrolyte battery according to claim 15, wherein the component (III) is one or more of the compounds (1a) and (1i); the compound having an O=S—F bond is at least one selected from the group consisting of lithium bis(fluorosulfonyl)imide, lithium (trifluoromethanesulfonyl)(fluorosulfonyl)imide, lithium fluorosulfonate, methanesulfonyl fluoride, ethanesulfonyl fluoride, 1,2-bis(fluorosulfonyl)benzene, and 1,3-bis(fluorosulfonyl)benzene; and the compound having an O=P—F bond is at least one selected from the group consisting of lithium bis(difluorophosphoryl)imide, lithium difluorophosphate, lithium fluorophosphate, lithium ethylfluorophosphate, and phenyl difluorophosphate.

18. A non-aqueous electrolyte battery at least comprising:
a positive electrode comprising at least one selected from the group consisting of oxides containing nickel and phosphates containing nickel, as a positive electrode active material;
a negative electrode; and
the electrolyte for a non-aqueous electrolyte battery according to claim 1.

19. A method for manufacturing a non-aqueous electrolyte battery, comprising the steps of:
impregnating a separator with the electrolyte for a non-aqueous electrolyte battery according to claim 1;
assembling a cell by disposing the separator between a negative electrode and a positive electrode containing at least one selected from the group consisting of oxides and phosphates each containing nickel as a positive electrode active material; and
adjusting the potential of the cell to 1.5 V or more and 4.5 V or less to decompose the additive (III) on the electrodes.

20. The electrolyte for a non-aqueous electrolyte battery according to claim 1,
wherein the compound represented by formula (1) is at least one selected from the group consisting of the following compounds (1b) to (1p):

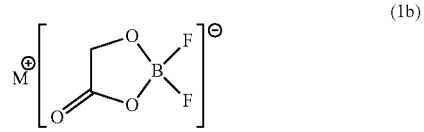

(1b)

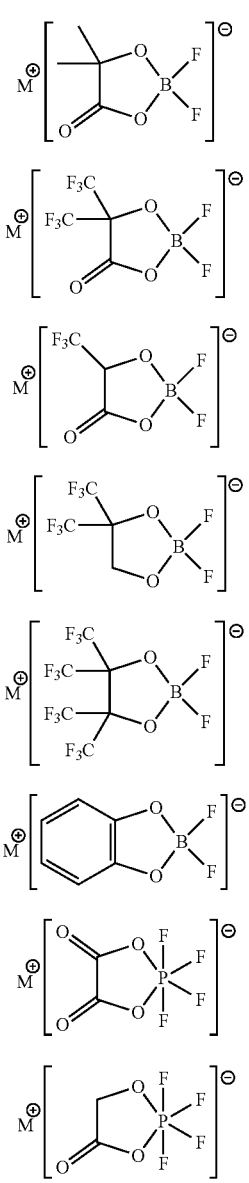
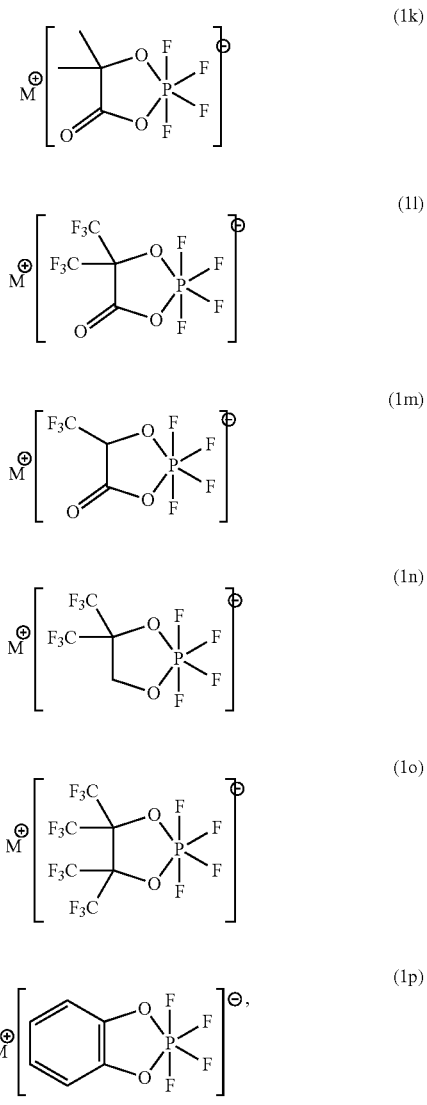
wherein M is as defined above.
* * * * *